(12) United States Patent  
Lee

(10) Patent No.: US 9,297,888 B2
(45) Date of Patent: *Mar. 29, 2016

(54) RADAR OPERATION WITH ENHANCED DOPPLER CAPABILITY

(71) Applicant: Robert W. Lee, Manton, CA (US)

(72) Inventor: Robert W. Lee, Manton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/637,263

(22) Filed: Mar. 3, 2015

(65) Prior Publication Data

US 2016/0011300 A1 Jan. 14, 2016

Related U.S. Application Data

(63) Continuation of application No. 14/290,708, filed on May 29, 2014, now Pat. No. 9,057,785.

(51) Int. Cl.
*G01S 13/95* (2006.01)
*G01S 7/41* (2006.01)
(Continued)

(52) U.S. Cl.
CPC ............... *G01S 7/41* (2013.01); *G01S 7/2926* (2013.01); *G01S 13/524* (2013.01); *G01S 13/582* (2013.01); *G01S 13/95* (2013.01); *G01S 2007/2886* (2013.01)

(58) Field of Classification Search
CPC ..... G01S 13/524; G01S 13/582; G01S 13/95; G01S 2007/2886; G01S 7/2926; G01S 7/41
USPC .......................................................... 342/127
See application file for complete search history.

(56) References Cited

U.S. PATENT DOCUMENTS 3,750,172 A 7/1973 Tresselt
3,883,871 A 5/1975 Moore
(Continued)

FOREIGN PATENT DOCUMENTS

EP 1314997 A1 5/2003
FR 2972055 A1 8/2012

OTHER PUBLICATIONS

European Patent Office, International Search Report of the International Searching Authority in PCT International Patent Application No. PCT/US2015/032478, which is an international application that shares the same priority as this U.S. application, mailed Sep. 7, 2015, 3 pages.

(Continued)

*Primary Examiner* — Timothy A Brainard
(74) *Attorney, Agent, or Firm* — Kolisch Hartwell, P.C.

(57) ABSTRACT

A method may include generating for transmission a repeating sequence of N constant-frequency pulses of width t seconds at interpulse intervals of T seconds, with each pulse in the sequence having a particular constant phase according to a quadratic phase sequence, which phase is applied to each pulse in a first sense of modulation. The method may further include modulating the phase of echo energy received from one or more objects reflecting the transmitted repeating sequence of N constant-frequency pulses with a second sense of modulation opposite to the first sense of modulation. The method may further include producing from the modulated received echo energy N unique and discrete frequency translations of the received echo energy as a function of range r of the reflecting objects, of magnitude equal to multiples of 1/NT Hz, which may preserve the spectrum of the received echo energy, forming in combination a composite signal frequency spectrum.

7 Claims, 14 Drawing Sheets

(51) Int. Cl.
*G01S 7/292* (2006.01)
*G01S 13/524* (2006.01)
*G01S 13/58* (2006.01)
*G01S 7/288* (2006.01)

(56) References Cited

U.S. PATENT DOCUMENTS

| | | | |
|---|---|---|---|
| 3,935,572 | A | 1/1976 | Broniwitz et al. |
| 4,042,925 | A | 8/1977 | Albanese et al. |
| 4,375,641 | A | 3/1983 | Josefsson et al. |
| 4,499,467 | A | 2/1985 | Rittenbach |
| 5,047,784 | A | 9/1991 | Gerlach et al. |
| 5,151,702 | A | 9/1992 | Urkowitz |
| 5,173,706 | A | 12/1992 | Urkowitz |
| 5,422,646 | A | 6/1995 | Lewis |
| 5,442,359 | A | 8/1995 | Rubin |
| 5,481,504 | A | 1/1996 | Rosenbach et al. |
| 5,500,647 | A | 3/1996 | Carrara |
| 5,528,246 | A | 6/1996 | Henderson et al. |
| 5,583,512 | A | 12/1996 | McEligot |
| 5,657,022 | A | 8/1997 | Van Etten et al. |
| 5,808,580 | A | 9/1998 | Andrews, Jr. |
| 5,815,250 | A | 9/1998 | Thomson et al. |
| 5,835,199 | A | 11/1998 | Phillips et al. |
| 5,870,054 | A | 2/1999 | Lewis |
| 6,225,943 | B1 | 5/2001 | Curley et al. |
| 6,411,249 | B1 | 6/2002 | Rose |
| 6,639,546 | B1 | 10/2003 | Ott et al. |
| 6,828,929 | B2 | 12/2004 | Barbella et al. |
| 7,064,704 | B2 | 6/2006 | Bergkvist |
| 7,081,848 | B1 | 7/2006 | Adams |
| 7,327,307 | B2 | 2/2008 | Adams et al. |
| 7,342,651 | B1 | 3/2008 | Woolfson |
| 7,605,744 | B1 | 10/2009 | Karhunen et al. |
| 9,057,785 | B1 * | 6/2015 | Lee .......... G01S 13/95 |
| 2009/0189740 | A1 * | 7/2009 | Wiesner .......... G08C 17/02 340/10.3 |
| 2013/0038486 | A1 * | 2/2013 | Lee .......... G01S 7/412 342/192 |

OTHER PUBLICATIONS

European Patent Office, Written Opinion of the International Searching Authority in PCT International Patent Application No. PCT/US2015/032478, which is an international application that shares the same priority as this U.S. application, mailed Sep. 7, 2015, 7 pages.

Guey, Jiann-Ching; "Diversity Waveform Sets for Delay-Doppler Imaging"; From IEEE Transactions on Information Theory, vol. 44, No. 4, Jul. 1998; 19 pages.

Wannberg, G.A., et al; "An ambiguity-function-based method for analysis of Doppler decompressed radar signals applied to EISCAT measurements of oblique UHF-VHF meteor echoes."; From Radio Science, vol. 31, Issue May-Jun. 1996 and © 1996; 3 pages.

Naval Air Warfare Center; "Electronic Warfare and Radar Systems Engineering Handbook"; Apr. 1999; 299 pages.

Merkel, K.D., et al; "Multi-Gigahertz radar range processing of baseband and RF carrier modulated signals in Tm: YAG"; From Journal of Luminescence 107 (2004) 62-74; 13 pages.

United States Patent and Trademark Office, Office action regarding U.S. Appl. No. 14/290,708, which is the parent application to this continuation application, mailed Jan. 13, 2015, 9 pages.

United States Patent and Trademark Office, Notice of Allowance regarding U.S. Appl. No. 14/290,708, which is the parent application to this continuation application, mailed Feb. 20, 2015, 8 pages.

* cited by examiner

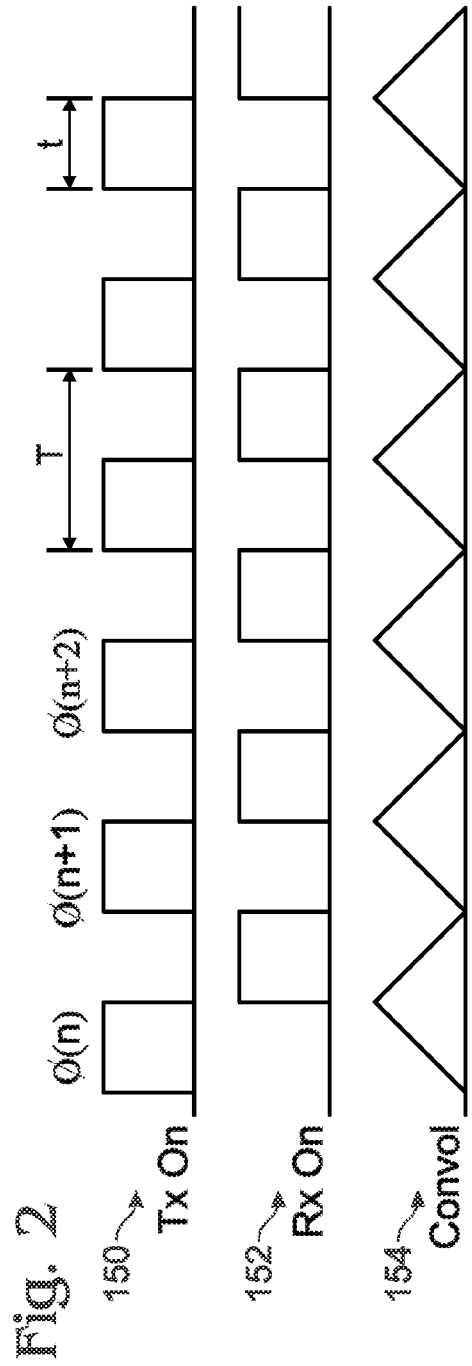
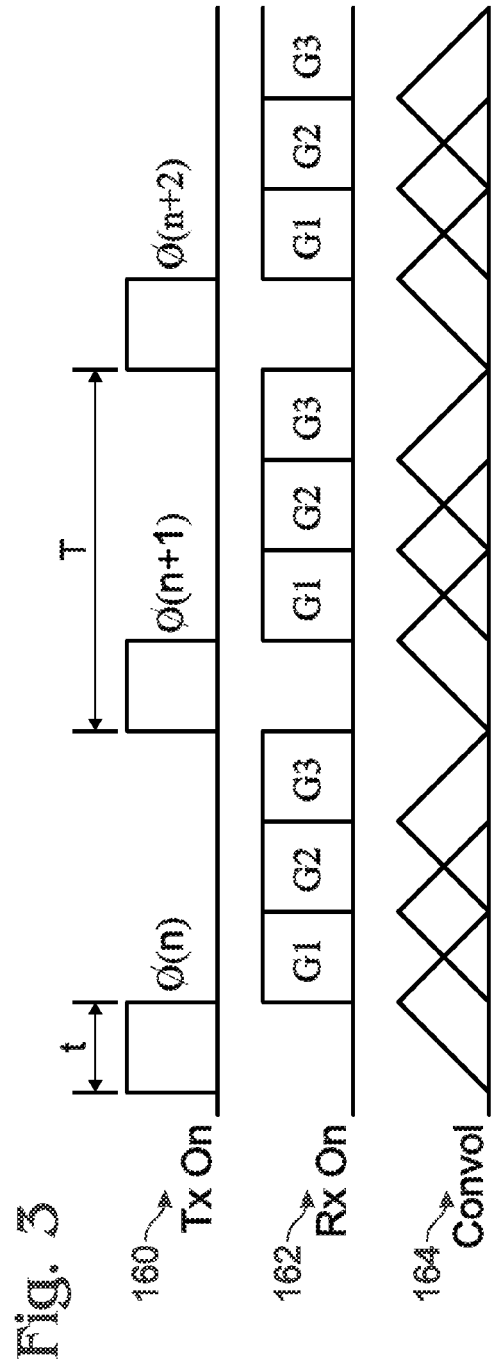

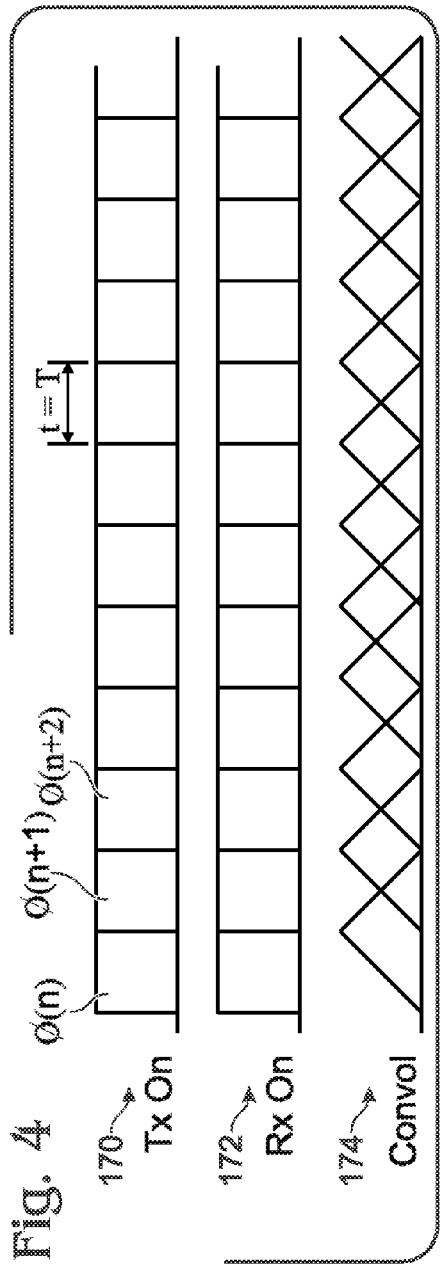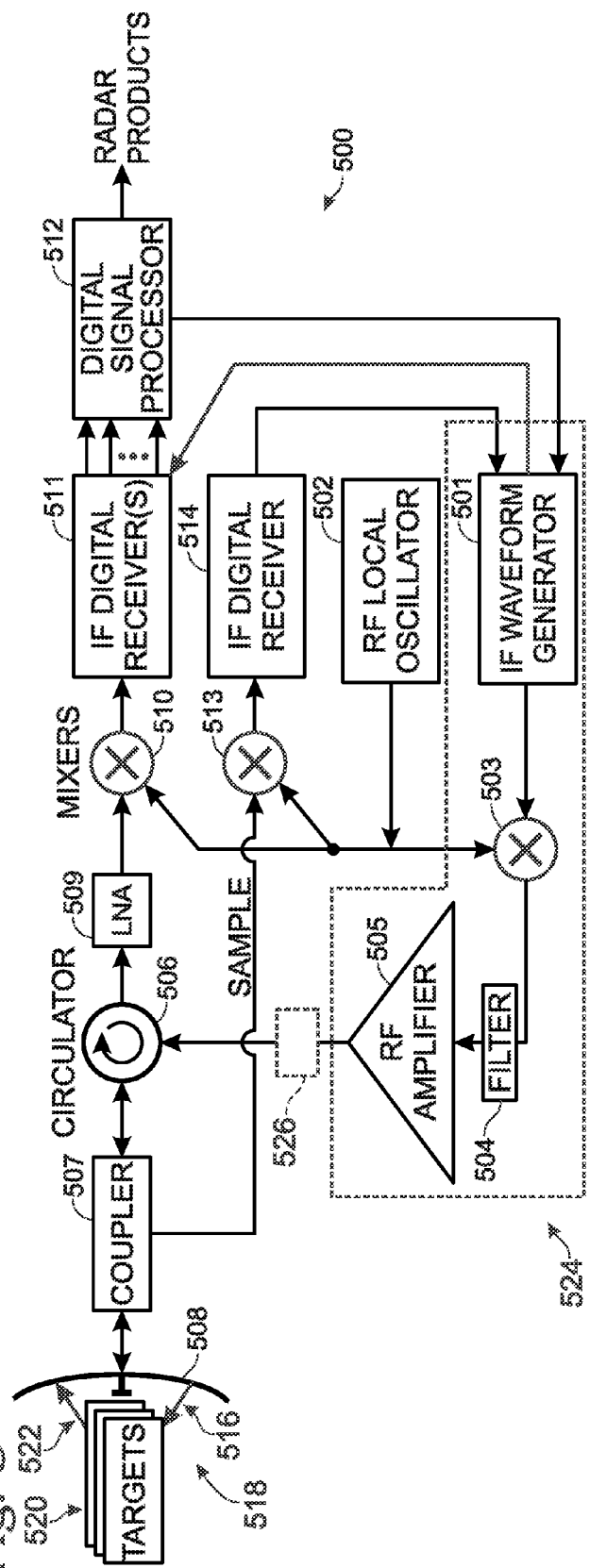

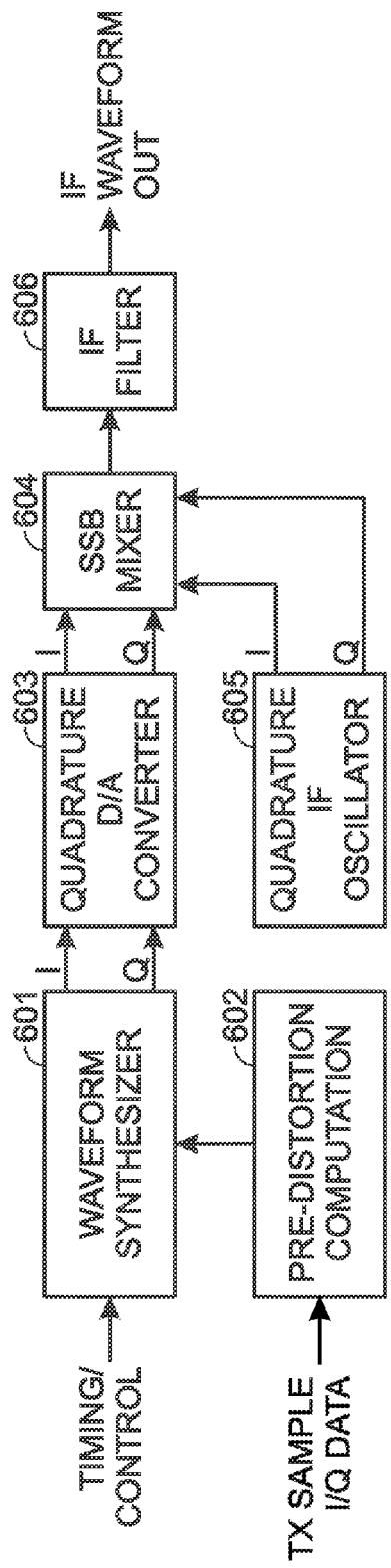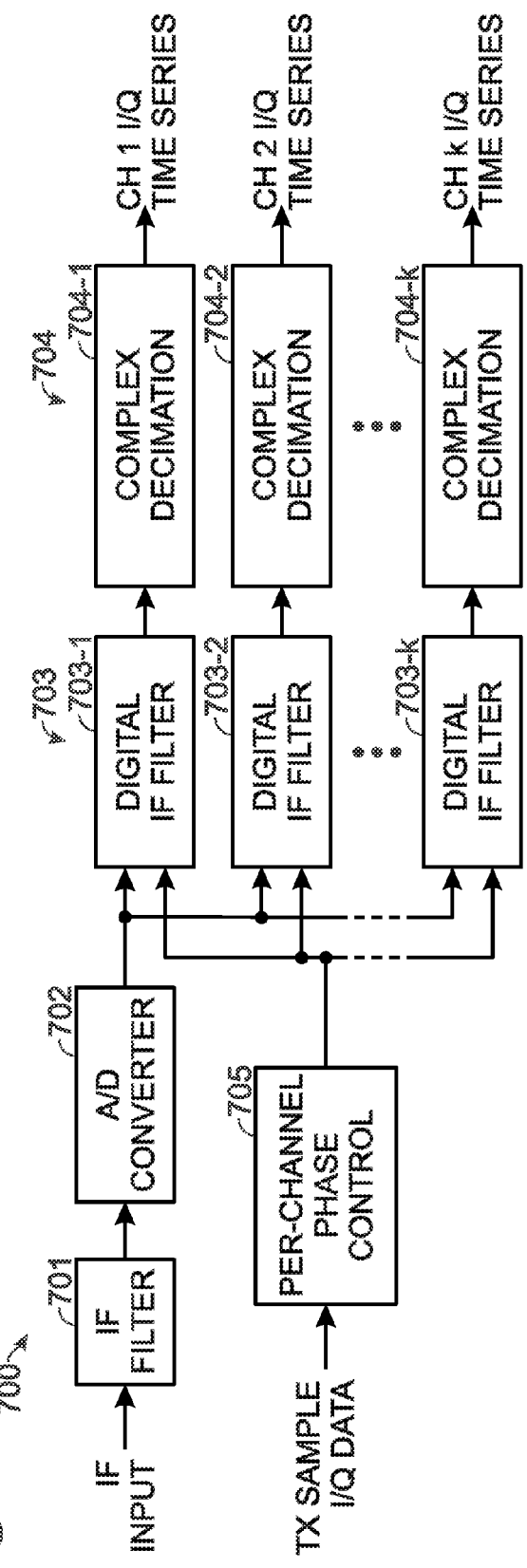

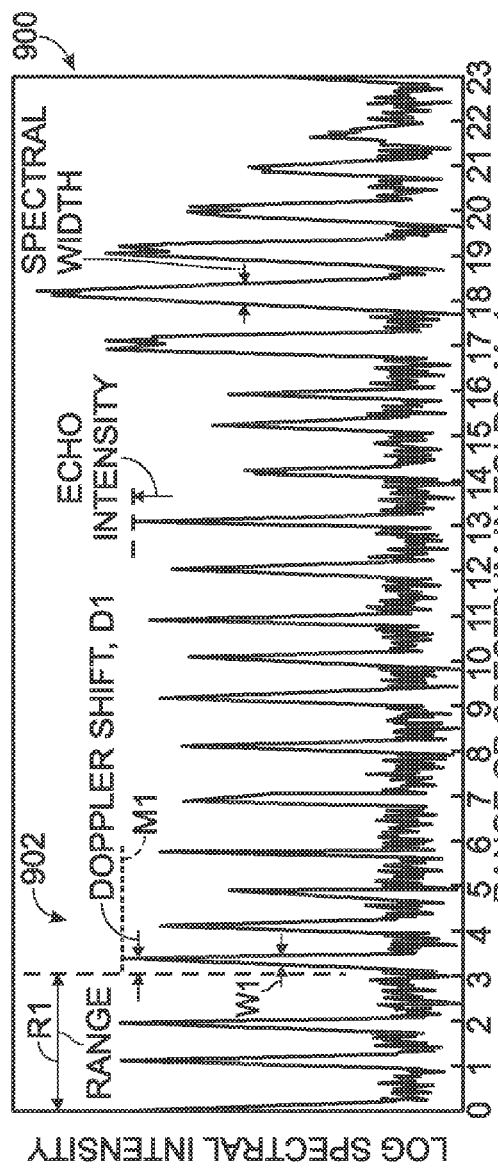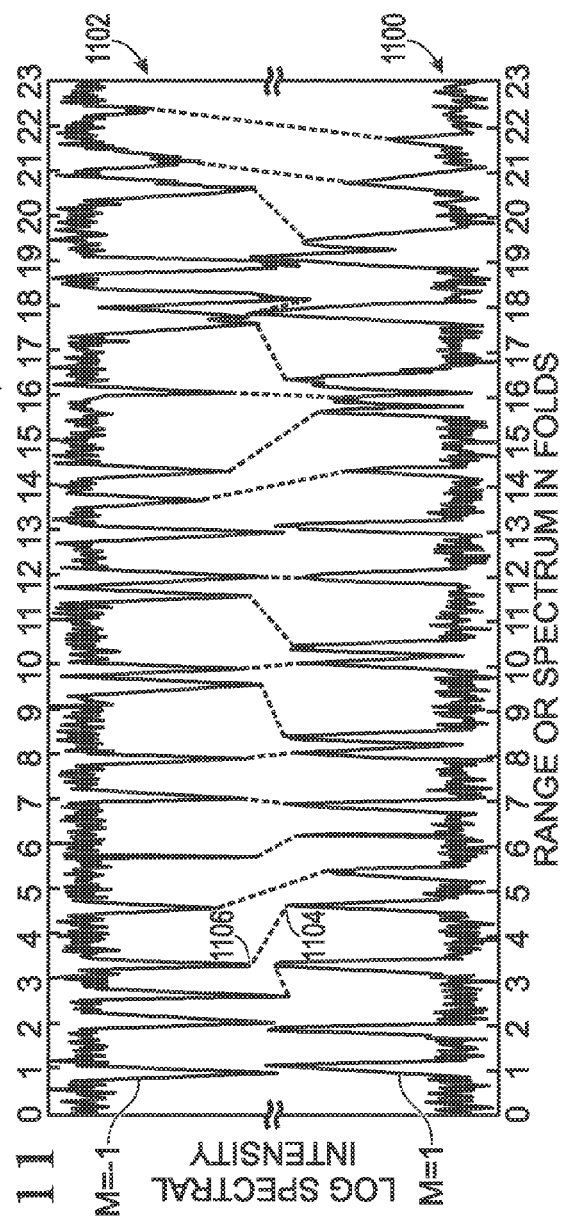

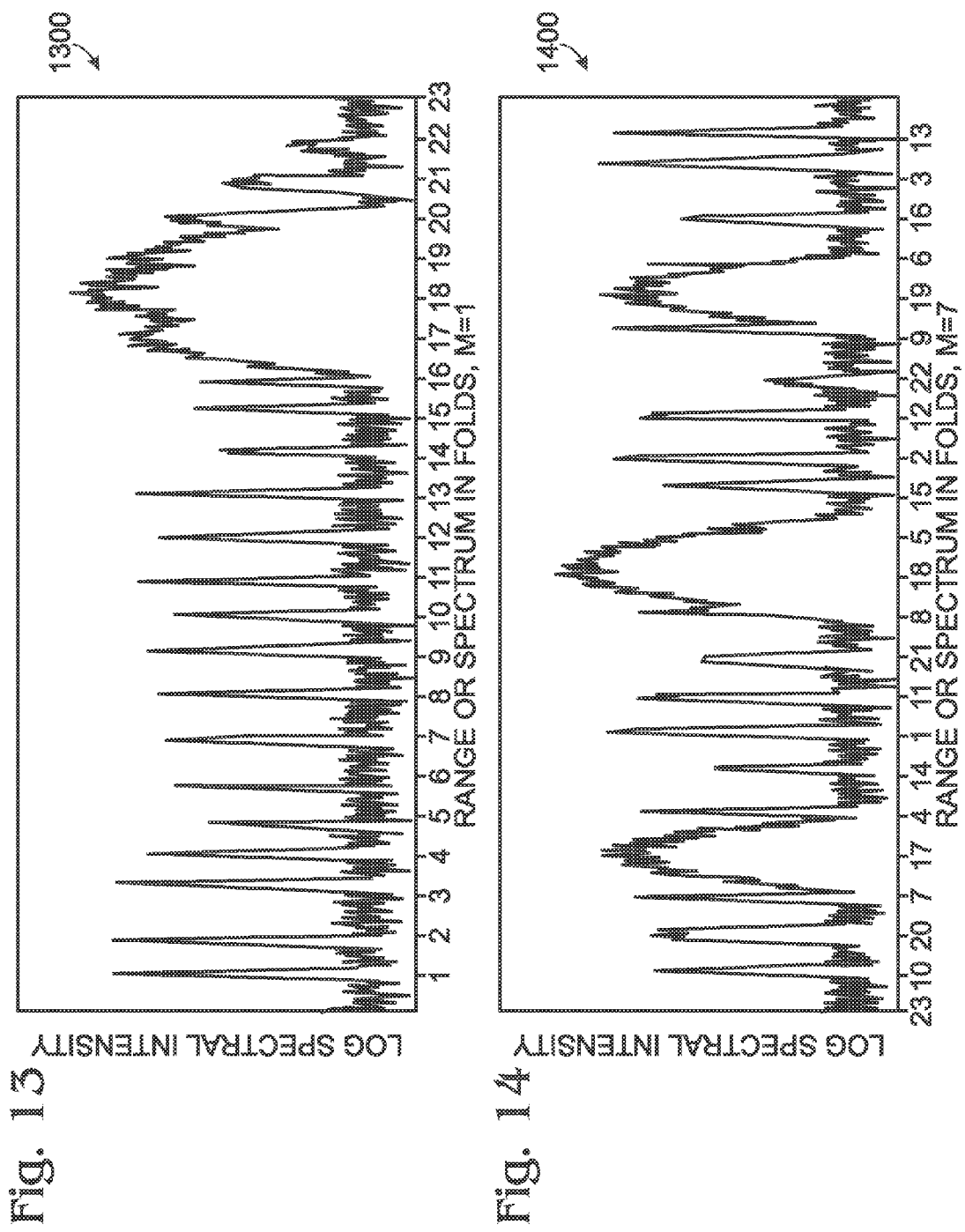

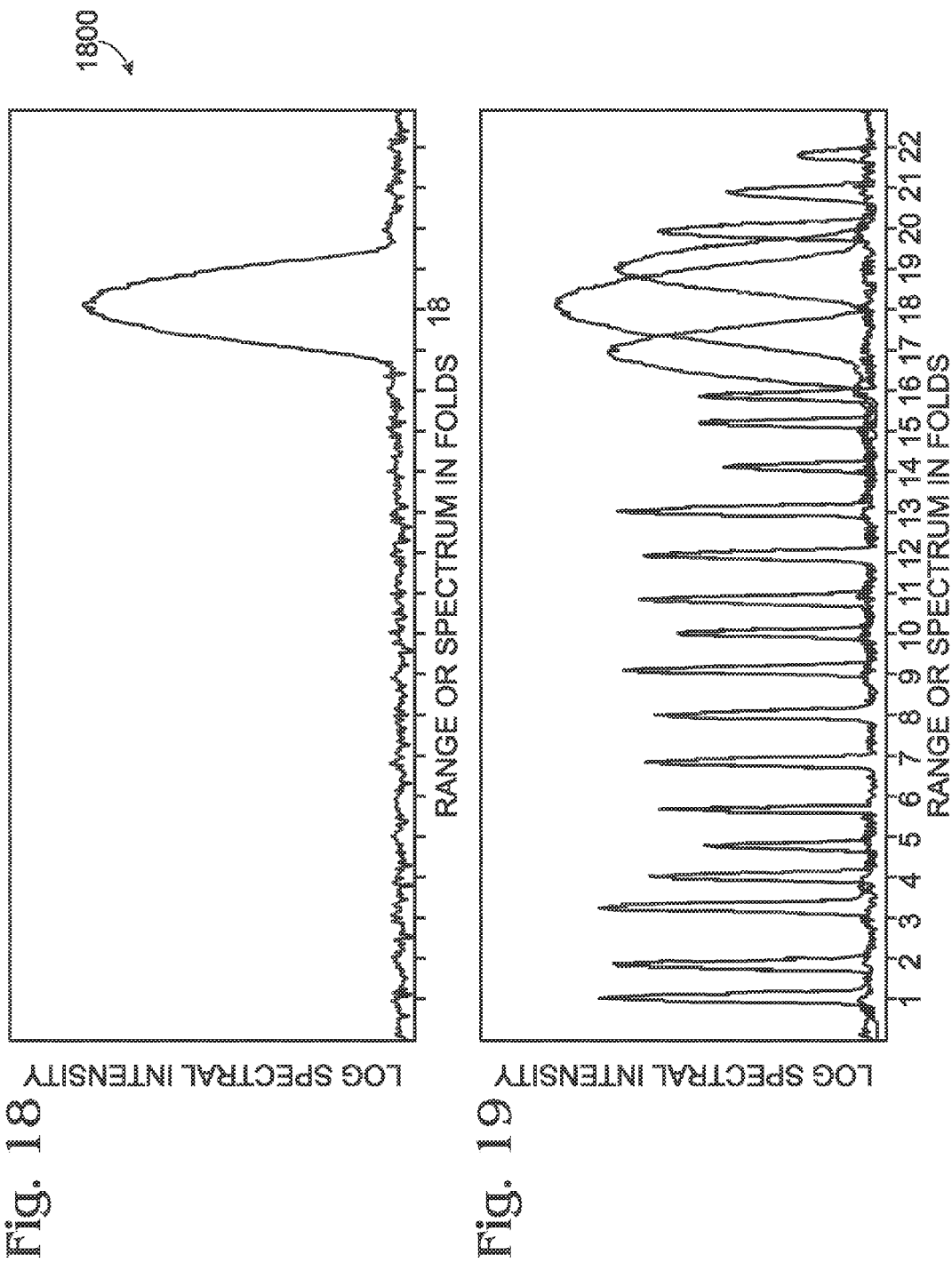

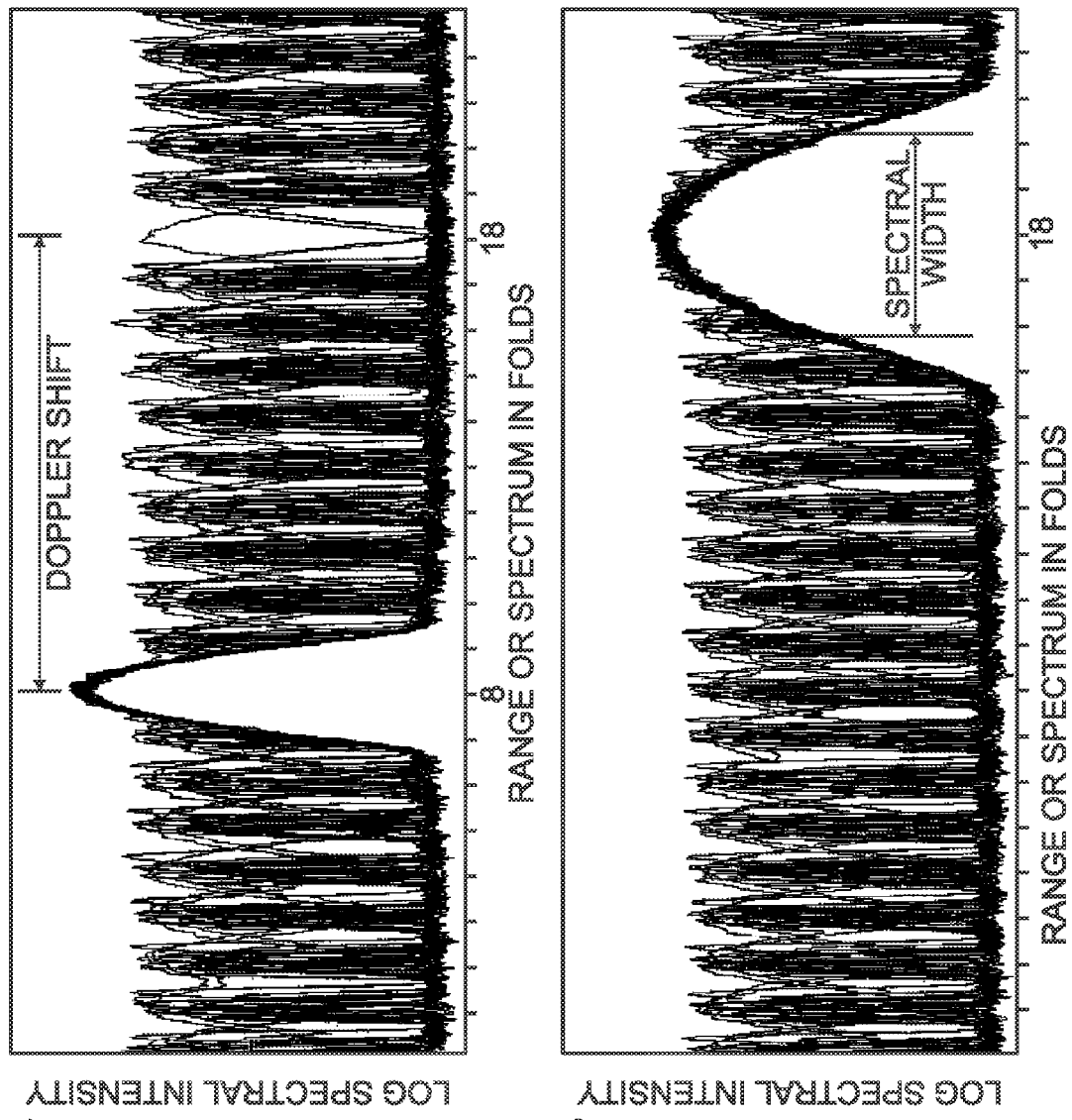

RADAR OPERATION WITH ENHANCED DOPPLER CAPABILITY

RELATED APPLICATION

The present application is a continuation of U.S. patent application Ser. No. 14/290,708, filed on May 29, 2014, the complete disclosure of which is hereby incorporated by reference herein in its entirety for all purposes.

FIELD

This disclosure relates to radar systems.

BACKGROUND

It is well known that pulsed Doppler radar systems have limits on unambiguous range and velocity, under which an increase in unambiguous velocity capability produces a decrease in unambiguous range capability, and vice versa. In practice this means that weather radars are unable to characterize the velocities present in severe weather events such as tornadoes. Methods to extend the unambiguous velocity range of weather radars include the use of multiple pulse-repetition frequencies, but such methods are unable to characterize the complex spectra encountered in tornadoes.

BRIEF SUMMARY

In one embodiment, a method for using reflections of wave energy from one or more reflecting objects to characterize certain properties of these objects through spectral characteristics of reflections from them, may comprise generating for transmission a repeating sequence of N constant-frequency pulses of width t seconds at interpulse intervals of T seconds. Each pulse in the sequence may have a particular constant phase according to a quadratic phase sequence, which phase may be applied to each pulse in a first sense of modulation. The method may comprise modulating the phase of echo energy received from the one or more objects reflecting the transmitted repeating sequence of N constant-frequency pulses during each receiving subinterval by the identical quadratic phase sequence used for the transmitted repeating sequence of N constant-frequency pulses, with a second sense of modulation opposite to the first sense of modulation, so that the net phase modulation applied to echo energy reflected from a particular reflecting object at a particular range r, measured in discrete units of T of round-trip echo time, may be a difference between the phase of the transmitted pulses at the time of their transmission and the phase applied to the received echo energy from range r, in either sense of the difference. The method may comprise producing from the modulated received echo energy N unique and discrete frequency translations of the received echo energy as a function of range r of the reflecting objects, of magnitude equal to multiples of 1/NT Hz, which frequency translations may preserve the spectrum of the received echo energy, forming in combination a composite signal frequency spectrum.

In another embodiment, a system may comprise a sequence generator, a modulator, and a signal processor. The sequence generator may be configured to generate for transmission a repeating sequence of N constant-frequency pulses of width t seconds at interpulse intervals of T seconds, with each pulse in the sequence having a particular constant phase according to a quadratic phase sequence, which phase is applied to each pulse in a first sense of modulation. The modulator may be configured to modulate the phase of echo energy received from one or more objects reflecting the transmitted repeating sequence of N constant-frequency pulses during each receiving subinterval by the identical quadratic phase sequence used for the signal generated for transmission, with a second sense of modulation opposite to that of the first sense of modulation, so that the net phase modulation applied to echo energy reflected from a particular reflecting object at a particular range interval r, measured in discrete units of T of round-trip echo time, may be a difference between the phase of the transmitted pulses at the time of their transmission and the phase applied to the received echo energy from range r, in either sense of the difference. The signal processor may be configured to produce from the modulated received echo energy N unique and discrete frequency translations of the received echo energy as a function of range r of the reflecting objects, of magnitude equal to multiples of 1/NT Hz, which frequency translations may preserve the spectrum of the received echo energy, forming in combination a composite signal frequency spectrum.

In another embodiment, a computer program product may comprise at least one computer readable storage medium having computer readable program instructions embodied therewith. The computer readable program instructions, when read by a processor of a signal-processing system of an echo-ranging system, may be configured to generate for transmission a repeating sequence of N constant-frequency pulses of width t seconds at interpulse intervals of T seconds, with each pulse in the sequence having a particular constant phase according to a quadratic phase sequence, which phase is applied to each pulse in a first sense of modulation. The computer readable program instructions, when read by the processor, may be further configured to modulate the phase of echo energy received from one or more objects reflecting the transmitted repeating sequence of N constant-frequency pulses during each receiving subinterval by the identical quadratic phase sequence used for the transmitted repeating sequence of N constant-frequency pulses, with a second sense of modulation opposite to the first sense of modulation, so that the net phase modulation applied to echo energy reflected from a particular reflecting object at a particular range r, measured in discrete units of T of round-trip echo time, may be a difference between the phase of the transmitted pulses at the time of their transmission and the phase applied to the received echo energy from range r, in either sense of the difference. The computer readable program instructions, when read by the processor, may be further configured to produce from the modulated received echo energy N unique and discrete frequency translations of the received echo energy as a function of range r of the reflecting objects, of magnitude equal to multiples of 1/NT Hz, which frequency translations may preserve the spectrum of the received echo energy, forming in combination a composite signal frequency spectrum.

BRIEF DESCRIPTION OF THE DRAWINGS

FIG. 2 is a diagram of an example of transmit time, receive time, and range-gate coverage for a one-gate radar, showing duty cycles and extent of range coverage.

FIG. 3 is a diagram of an example of transmit time, receive time, and range-gate coverage for a three-gate radar, showing duty cycles and extent of range coverage.

FIG. 4 is a diagram of an example of transmit time, receive time, and range-gate coverage for a continuous-wave (CW) radar, showing duty cycles and extent of range coverage.

FIG. 5 is a block diagram of an example of a microwave Doppler radar system for generating one or more channels of coherent microwave pulses with prescribed phase sequences, receiving the phase sequences, and processing one or more channels of the received sequences.

FIG. 6 is a block diagram of an example of an intermediate frequency (IF) waveform synthesizer for generating sequences of pulses at an IF frequency with a prescribed phase sequence.

FIG. 7 is a block diagram of an example of IF portions of a microwave receiver for IF filtering, A/D conversion, digital IF filtering, complex demodulation in one or more channels, and controlling the phase of each output channel independently.

FIG. 9 is a chart which may be produced by the method of FIG. 8, illustrating an example of range response presented in spectral form, for targets with unambiguous velocities, showing a direct relationship between spectral features and target parameters.

FIG. 11 is a chart which may be produced by the method of FIG. 10, illustrating an example of range response presented in spectral form, for targets with moderately ambiguous velocities but without spectral overlap, showing use of two phase sequences, one of which reverses a sense of Doppler shift, with an upper curve plotted in an inverted orientation for clarity, illustrating resolution of moderate Doppler ambiguities.

FIG. 13 is a chart which may be produced by the method of FIG. 12, illustrating an example of range response presented in spectral form, for targets with severely ambiguous velocities, showing fully ambiguous situation over several gates due to relatively wide spectral widths.

FIG. 14 is another chart which may be produced by the method of FIG. 12, illustrating an example of range response for the situation in FIG. 13, with permuted range order achieved through modification of the phase sequence parameter M, allowing parameter estimation for the reflections of four targets which were fully overlaid in FIG. 13.

FIG. 18 is another chart which may be produced by the method of FIG. 16, illustrating an example of range response for range 18, taken from data for FIG. 17 by picking a minimum response at each spectral frequency, leaving an estimate for a signal at range 18 uncontaminated by other range gates.

FIG. 19 is another chart which may be produced by the method of FIG. 16, illustrating an example of range response as created from data from FIG. 13, with each range gate estimated by a process used to create FIG. 18, with all range responses fully disambiguated.

FIG. 22 is another chart which may be produced by the method of FIG. 16, illustrating an example of the range response of FIG. 17, but with a Doppler shift of a signal at gate 18 substantially increased, to demonstrate an example of recovering parameter signals with relatively large Doppler shifts that are highly overlapped with signals from other range gates in a primary spectra for various values of M.

FIG. 23 is another chart which may be produced by the method of FIG. 16, illustrating the range response of FIG. 17, but with a spectral width of the signal at gate 18 substantially increased, to demonstrate an example of recovering parameters of relatively wide signals that are highly overlapped with signals from other range gates in the primary spectra for various values of M.

DETAILED DESCRIPTION

Systems and methods are disclosed herein for echo-ranging simple or complex objects, whereby characteristics of echoes can be analyzed in a spectral domain to provide information on location, echo intensity, radial velocity, relative motion, and/or other properties of the objects.

Figure 1:
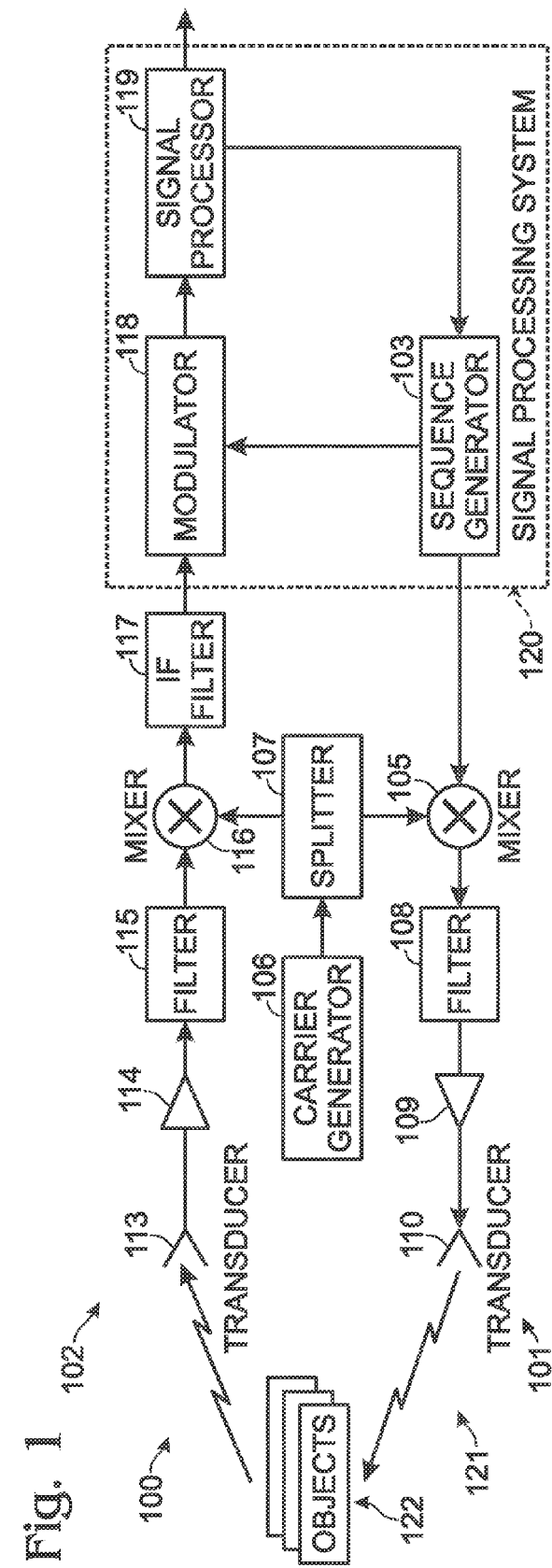
FIG. 1 is a block diagram of a generalized echo location system for generating one or more channels of coherent pulses with phase sequences, receiving and processing reflections of such sequences.

FIG. 1 is a block diagram of an exemplary generalized system, shown generally at 100, for such echo-ranging with mono-static, bi-static, and/or multi-static operation. Echo-ranging system 100 may include a transmitter 101 and a receiver 102. Transmitter 101 may include an intermediate frequency (IF) sequence generator 103, a mixer 105, a carrier generator (or carrier frequency oscillator) 106, a splitter 107, a filter 108, an amplifier 109, and a signal transducer 110. Receiver 102 may include a transducer 113, an amplifier 114, a filter 115, a mixer 116, an IF filter 117, a modulator (e.g., a quadrature demodulator) 118, and a signal processor 119. In this example, the transmitter and receiver share sequence generator 103, carrier generator 106, splitter 107, and signal processor 119. Sequence generator 103, modulator 118, and signal processor 119 may be included in a signal processing system 120.

Transmitter 101 may also be referred to as a first electronic device. The transmitter may generate plural transmit pulses having a common first frequency. For example, transmitter 101 may create and/or transmit a poly-phase coded sequence of pulses (or phase-coded sequence of pulses) having the common first frequency. Such a phase-coded sequence may be generated at an appropriate and/or convenient IF frequency by phase sequence generator 103. The IF phase sequence signal may be sent to modulator 118, and to mixer 105 (e.g., to an input port of mixer 105).

Another input port of mixer 105 may be fed by carrier frequency generator 106, via splitter 107. Mixer 105 may mix the IF phase signal and the carrier signal to produce either a sum signal or a difference signal, and in effect modulate the carrier signal with the different transmit phases in the IF transmit phase signal. However, modulation of the signal to be transmitted may be produced by modulating the baseband signal (e.g., from, at, and/or by signal processor 119), the IF signal (e.g., from, at, and/or by sequence generator 103), and/or the RF signal (e.g., from, at, and/or by carrier generator 106).

The output of mixer 105, at a system transmission frequency, may be filtered by filter 108 to select either the sum signal or the difference signal of the result of mixing the IF frequency and the carrier generator frequency by mixer 105, which may produce a filtered transmission signal. The filtered transmission signal may then be amplified by amplifier 109 to produce an output transmission signal.

The output transmission signal may be transmitted via signal transducer 110 into transmission medium 121. The transmission medium may be any medium that conducts the transmitted signal transduced by signal transducer 110. For example, the transmission medium may be a solid material, such as the earth, a liquid, such as water, or a gas, such as air. The signals transmitted from transducer 110 may be reflected from one or more objects 122 that are reflective of the transmitted signal, which objects may include variations in the refractive index of the transmission medium.

It is seen then in this example that transmitter 101 transmits plural transmit pulses having the common carrier frequency. The transmit pulses are modulated with different transmit phases for transmission in transmission medium 121 to determine at least one parameter of the one or more objects 122 that reflect at least one of the pulses transmitted from transducer 110. In some embodiments, system 100 may be configured to generate the plural transmit pulses having an optical frequency, a radio frequency, or an audio frequency. In some embodiments, the system may be configured to transmit the plural transmit pulses as electromagnetic waves or as mechanical waves.

Receiver 102 may also be referred to as a second electronic device. The receiver may receive reflected pulses produced by reflection of the plural transmit pulses by each of one or more reflective objects 122 in transmission medium 121. For example, receiver 102 may receive and/or analyze echoes of the transmitted signal that are reflected from the reflective objects. Specifically, the echoes may be received by transducer 113 to produce a receive signal. The receive signal is then amplified by amplifier 114 and filtered by filter 115. The receive signal may be described as a signal associated with the echoes.

The signal associated with the echoes (e.g., the filtered amplified receive signal) may be sent to mixer 116. A portion (or part) of the signal (e.g., the third signal) from carrier generator 106 may be sent to mixer 116 via splitter 107. Mixer 116 may mix the signal associated with the echoes with a portion of the carrier signal from carrier generator 106, via splitter 107, to produce an IF signal representative of the transmit phase applied to the transmit pulse.

For example, the IF transmit-phase signal may be filtered by IF filter 117 and sent to modulator 118. Modulator 118 may process the IF transmit-phase signal with a current phase signal currently being produced by IF phase sequence generator 103 to produce a phase change signal. The sign of the demodulation may be such that the sum of the phase shifts applied to the signal in the transmitter 101 and in the receiver 102 represents the difference of the phase sequence generated by the IF phase sequence generator 103 at two points in time, one point being the time that the signal was transmitted by transmitter 101, and the other point being the time at which the echo from the reflective object returned to the receiver 102. The output signal of modulator 118 may be a complex time series based on the demodulated signal and that may be digitized for spectral analysis.

In some embodiments, system 100 may be configured to coherently integrate a plurality of the modulated receive pulses prior to producing the first composite signal-frequency spectrum. In some embodiments, the system may be configured to generate the plural transmit pulses by modulating for each pulse an incoherent carrier with a coherent modulation signal having the transmit phase.

System 100 may determine, from the first composite signal-frequency spectrum, the at least one parameter of a first reflective object of one or more objects 122 that reflected at least one of the transmitted pulses. For example, the output signal of modulator 118 may contain data that may be indicative of parameters of intensities of objects 122, radial velocities of objects 122, and/or internal motions in the spectrum of the complex time series (e.g., the first composite signal-frequency spectrum), for example, in a manner further described below. The output signal of modulator 118 may be sent to signal processor 119. Signal processor 119 may determine from the first composite signal-frequency spectrum the at least one parameter of at least the first reflective object.

Performance parameters of echo-ranging system 100 may be determined by timing and phase characteristics of the transmitted signals. The transmitted signals may be may also be referred to as waves or waveforms.

System 100 may be configured to transmit the transmit pulses from transducer 110 in a first location. System 100 may be configured to receive the receive pulses at the first location (such as in a mono-static operating mode) or at one or more second locations spaced from the first location (such as in a bi-static or multi-static operating mode). For example, transducer 113 may be integrated into transducer 110 in the first location, or may be located at a second location that is spaced apart from the location of transducer 110.

FIG. 2 shows one type of transmitted waveform that may be suitable for mono-static operation of echo-ranging system 100. In FIG. 2, a maximum duty cycle may be assumed. A top plot in FIG. 2 shows a sequence 150 of transmitted pulses of uniform pulse width t and pulse repetition time T. Sequence 150 may define a transmitting period and may correspond to the signals transmitted from transducer 110 of transmitter 101 of FIG. 1. Each pulse may have a constant phase $\phi(n)$ over the respective pulse, but the phase may differ pulse to pulse according to a prescribed sequence. For example, the plural transmit pulses generated by system 100 (see FIG. 1) may include (or be) a sequence of transmit pulses, with each pulse in the sequence of pulses having the first frequency with a particular phase.

A middle plot in FIG. 2 shows intervals 152 when receiver 102 (see FIG. 1) can operate without interference from transmitter 101. In other words, FIG. 2 shows intervals 152 corresponding to times when pulses of sequence 150 are not being transmitted. Intervals 152 may be and/or define receiving periods.

A lower plot in FIG. 2 shows a resulting convolution 154 of (and/or between) the receiving period associated with intervals 152 and the transmitting period associated with sequence 150. Convolution 154 may illustrate a range sensitivity of system 100 of FIG. 1.

FIG. 3 shows a pulse sequence for a reduced duty cycle transmitter using three exemplary range gates, identified as range gates G1, G2, G3, which may be suitable for incorporation into system 100 of FIG. 1. Each range gate may use the same phase sequence and may be processed independently.

A top plot in FIG. 3 shows a sequence 160 of transmitted pulses of uniform pulse width t and pulse repetition time T. Sequence 160 may correspond to the transmitted signals from transmitter 101 of FIG. 1 (e.g., from transducer 110). The period of time during which each pulse in sequence 160 is transmitted may be considered a transmitting period. Each pulse may have a constant phase φ(n) over the respective pulse, but the phase may differ pulse to pulse according to the prescribed sequence.

A middle plot in FIG. 3 shows intervals 162 when receiver 102 (see FIG. 1) can operate without interference from transmitter 101. For example, FIG. 2 shows intervals 162 corresponding to times when pulses of sequence 160 are not being transmitted, and represent receiving periods. Each interval of intervals 162 may correspond to reception of a range gate G1, G2, or G3. For example, each range gate may correspond to a range of distance of an object from the combination of transducers 110 and 113 (see FIG. 1). The first range may be closer to the transducers than the second and the third ranges, and the second range may be closer to transducer 113 than the third range.

A lower plot in FIG. 3 shows a resulting convolution 164 of between the receiving period associated with intervals 162 and the transmitting period associated with sequence 160. Convolution 164 may illustrate a range sensitivity of system 100 of FIG. 1.

Accordingly, it is seen that system 100 (and/or system 500—see FIG. 5) may be configured to generate transmit pulses at spaced intervals having a duration between transmit pulses that is a plurality of a duration of each transmit pulse. Either of systems 100 and/or 500 may be configured to receive the receive pulses between consecutive transmit pulses for a plurality of gates that each have a duration corresponding to the duration of the transmit pulses.

FIG. 4 shows a pulse sequence for a bi-static or multi-static configuration that may be suitable for incorporation into system 100 of FIG. 1. A top plot in FIG. 4 shows a sequence 170 of transmitted pulses of uniform pulse width t and pulse repetition time T. Sequence 170 may occur over a period of transmission and correspond to the transmitted signals from transmitter 101 of FIG. 1 (e.g., from transducer 110). Each pulse may have a constant phase φ(n) over the respective pulse, but the phase may differ pulse to pulse according to the prescribed sequence. The transmitted (or transmitter) pulses of sequence 170 may be contiguous, with separate, constant phases over each interval t. In the example illustrated in FIG. 4, interval t is equal to pulse repetition time T.

A middle plot in FIG. 4 shows intervals 172 that may be received for a predefined receiving period corresponding to the period of transmission of sequence 170. A lower plot in FIG. 4 shows a resulting convolution 174 of the receiving period associated with intervals 172 and the pulse transmission periods associated with sequence 170. Convolution 174 may illustrate a range sensitivity of system 100 of FIG. 1.

In some embodiments, an approximate distance may be known of an intended reflective object from a transmitter (e.g., transducer 110) transmitting the transmit pulses. The system may be configured to generate the plural transmit pulses contiguously for a first time period less than the time period for transmit pulses to travel to the intended reflective object and the reflected transmit pulses to travel from the intended reflective object to the electronic receiver device, and after the first time period, receive the receive pulses for a second time period at least as long as the first time period. In some embodiments, the system may be configured to ignore any receive pulses received during the first time period.

In FIGS. 2-4, the transmitter pulses are shown as being rectangular. However, in other embodiments the transmitter pulses may not be rectangular. For example, the transmitter pulses may have other shapes that may reduce a required signal bandwidth.

Generation of the plural transmit pulses in system 100 (see FIG. 1) may include system 100 setting the phases of successive transmitter pulses according to a quadratic equation. For example, the phase sequence (e.g., the phase-coded sequence of pulses produced by transmitter 101) may comprise a general quadratic sequence, such as the quadratic sequence of equation (1), where n is the sequential index of the transmitted pulses:

$$\phi(n)=M(an^2+bn+c). \quad \text{Equation (1)}$$

This general quadratic sequence may be applied to both the transmitted and received signals (or waveforms), where n may be a sequential index (or sequence number) of the transmitted pulses, M may be an integer having no cofactors with N, with M=1 for the basic case, and coefficients a, b, c may be in units of phase, such as radians, degrees, or other angular units, in the interval [0, 2π], beyond which interval the sequence φ(n) "folds" back when considered modulo one revolution of phase. φ may be the phase in radians, and n may represent the sequence number of a corresponding pulse of duration t and may be an integer between 1 and N, where N may be an integer equal to the number of pulses in the repeating sequence of pulses.

If the receiving system mixer (e.g., mixer 116) is configured so that the phase of the complex time series at a given time interval n is the phase of IF phase sequence generator 103 minus the phase of the received (or receive) signal output from IF filter 117, then the net phase modulation applied to an echo at range delay r, and time n+r expressed in terms of units of T, due solely to the repeated application of the phase sequence, may be determined with equation (2).

$$\phi if(n)=\phi(n+r)-\phi(n). \quad \text{Equation (2)}$$

The first term on the right of equation (2) (i.e., φ(n+r)) may represent a local-oscillator phase (e.g., of IF phase sequence generator 103 in this example) at time n+r when the echo was received. The second term on the right of equation (2) (i.e., φ(n)) may represent the transmitter phase when the pulse was transmitted (e.g., from signal transducer 110) at time n. This sequence of phases will be different and unique for different values of M within [1, N], provided that N is a prime number, and a=π/N radians. This difference may be expanded using equation (1), resulting in equation (3). It will be appreciated that other phases in the sequence may be used to determine a phase difference, which phase or phases would be offset from one or both of the transmit and receive phases.

$$\phi if(n)=2Manr+\text{terms unchanging with } n. \quad \text{Equation (3)}$$

The terms not changing with n may produce phase shifts not changing in time, and may be neglected. The echo signal from range r may exhibit a phase shift which increases by the amount 2Mar per time interval T, as n increments from n to n+1, which may be equivalent to a frequency shift F at range r described by equation (4).

$$F(r)=2Mar/T \text{ Hz}. \quad \text{Equation (4)}$$

Frequency shift F(r) may be interpreted modulo 1/T Hz. Thus, echoes from each range interval of time width T may be translated linearly and discretely to a respective frequency interval in a spectrum of the complex time series output from quadrature modulator 118.

Since the sampling interval of the complex time series is T seconds, an unambiguous frequency range of the spectrum may be limited to 1/T Hz, and the spectral shift F may be interpreted modulo 1/T Hz. Since the frequency shift may increase linearly with gate number r for M=1, the maximum value of r may be determined by solving for the value of r, which produces a phase shift per interval T of $2\pi$ radians. For a case where M=1, solving for the value of r, which may produce a frequency shift equal to 1/T Hz, equivalent to $2\pi$ radians per sample time T, as shown in equation (5) for the case where the transmitter and receiver are the same distance from the reflective object or target:

$$2ar_{max}=2\pi \text{ radians,} \qquad \text{Equation (5)}$$

$$r_{max}=\pi/a, \qquad \text{Equation (6)}$$

Using N as the length of the repeating sequence of pulses, $$r_{max}=N, \text{ and } a=\pi/N \qquad \text{Equation (7)}$$

A round-trip time delay corresponding to the maximum range is then NT, beyond which echoes may fold to lower ranges in the spectrum, and the number of range gates may be N. Higher values of the integer M may not change the maximum unambiguous range, but simply may re-order the ranges in the frequency spectrum.

The object echoes may not only have a frequency shift due to the phase sequence, expressed by equation (4), but the object echoes may also have Doppler frequency shifts due to object motion relative to the transducers (e.g., transducers 110, 113) or an antenna (e.g., antenna 508—see FIG. 5), as well as frequency spreads due to internal motions of the object. With the value of the coefficient a set to $\pi/N$ radians, the return from each range interval r may be unambiguous if the Doppler frequency shift of the return from each range interval r falls within a spectral window of width equal to dF, centered at frequency F, interpreted modulo 1/T Hz, where dF is determined by equation (8).

$$dF=2a/T \text{ Hz, and } F=2Mar/T \text{ Hz.} \qquad \text{Equation (8)}$$

In this way the value of a may be selected to set a desired maximum range interval, and a defined range of unambiguous velocity may be thus established.

As is discussed below and illustrated in the figures, violations of this strict unambiguous velocity interval may be accommodated. The translation of object range, Doppler shift, and spectral width is a linear one, so all features of the object spectrum may be faithfully represented in the translated frequency spectrum. In cases where an object echo is very broad or much displaced from the object echo's strictly unambiguous position, but the object echo does not overlie the spectra of echoes from other ranges, the object parameters may be deduced from the spectrum directly. But if the object echo is partially or completely overlain by other object spectra, it may still be possible to recover the parameters of the object echo. This is possible due to the ability of the parameter M to alter the spectral order.

The integer parameter M in equation (1) that multiplies the phase shifts may be applied to each transmitted and received pulse. For example, if M=−1 the phase shifts applied to the transmitted and received pulses may be negated and the order of range in the spectrum may be reversed (e.g., the spectrum modulo 1/T Hz may be considered between zero and +1/T Hz, with range running in the reverse order in frequency). For example, if there are many successive range gates with object echo spectra, each of which has a Doppler shift greater than the limit suggested in equation (8) above, but the spectra are not seriously or substantially overlapped, it may be impossible or difficult to resolve accurately the true ranges corresponding to the spectral peaks from a single data set (e.g., a single complex time series produced by modulator 118). However, by acquiring another data set with M=−1, the sign of the relationship between Doppler shift and the frequency shift due to the phase sequence may be reversed, which may provide extra degrees of freedom to revolve the true range for each spectral feature.

Furthermore, higher integer values of M with no common factor with N, may completely re-order the frequency versus range relationship. For example, such higher integer values of M can separate consecutively spaced, wide and overlapping spectral features by moving these features apart from one another to other areas of the spectrum. If not separated, then these features may otherwise overlap one another and be impossible or difficult to resolve accurately. For example, with M=7 each range gate in the spectrum may be placed at a frequency seven times a nominal range spacing from neighboring echoes of the respective range gate, modulo the maximum frequency 1/T Hz. Thus a group of crowded, wide features may be separated by seven times the value of the spectral window nominally allowed for each range gate. Since the frequency versus range relationship may be completely re-ordered by integer values of M with no common factor with N, it may be advantageous for N to be a prime number.

As a result of such a re-ordering of the frequency versus range relationship, it may be possible to recover true values of range, Doppler shift, spectral width, and/or other spectral features, even for situations with densely packed, very wide and/or highly Doppler-shifted spectral features. In some embodiments, it may be possible to recover true values of range, Doppler shift, spectral width, and/or other spectral features provided that only a minority of range gates is affected by densely packed spectral features, relatively wide spectral features, and/or highly Doppler-shifted spectral features.

It will be appreciated that quadratic phase sequences of the type in equation (1) are often used in matched-filter pulse compression radars, where the pulse sequences are always processed in groups of N pulses to take advantage of the orthogonal character of the sequences. However, systems and methods of the present disclosure may not use the orthogonal character of the pulse sequence, other than to permute the range order of the data, but rather may process data with spectra produced by extended data sets of arbitrary length, not limited to multiples of N. The data, the spectra produced, and/or the data sets may be windowed to improve the spectral resolution and dynamic range of the spectra.

For an example of this technique see the description below of a preferred microwave implementation.

FIG. 5 is a block diagram of an embodiment of an echo-ranging microwave Doppler radar system or transceiver, generally indicated at 500. It is common in weather radar to refer to reflective objects as targets as a carryover from legacy uses of radar. Accordingly, in the following description the term target is considered synonymous with reflective object.

A transmitter portion of radar system 500 may include an IF waveform generator 501, an RF local oscillator 502, a mixer 503, an RF filter 504, a radio frequency (RF) amplifier 505, a circulator 506, a directional coupler 507, and a transducer in the form of an antenna 508. A receiver path of radar system 500 may include antenna 508, coupler 507, circulator 506, a low noise amplifier (LNA) 509, a mixer 510, one or more IF digital receiver(s) 511, and a digital signal processor 512. A transmitter sample channel of radar system 500 may include directional coupler 507, a mixer 513, and an IF digital receiver 514.

In an embodiment of a dual-polarization radar system, all or a portion of radar system 500 may be duplicated to provide a second polarization channel.

Radar system 500 may be a transceiver that uses a single antenna for transmit and receive. Radar system 500 may include a transmitter and a receiver that share an RF signal produced by RF local oscillator 502. In some examples, separate transmit and receive antennas may be used. In some examples, separate transmitters and receivers may be used. The separate transmitters and receivers may be positioned at the same location or at separate or remote locations.

The transmission portion of system 500, also referred to a first electronic device, may be configured to generate plural transmit pulses 516 having a common first frequency modulated with different transmit phases for transmission in a transmission medium 518 to determine at least one parameter of one or more reflective targets 520. Target 520 may be in a transmission medium 518, which in the case of weather radar is ambient air. Targets 520 may reflect at least one of transmitted pulse sequence 516. For example, the transmission portion of the system may include IF waveform generator 501. IF waveform generator 501 may produce pulsed waveforms of constant pulse repetition frequency (PRF) and pulse width, at one or more IF frequencies. Waveform generator 501, described further below, may modulate the phase of the waveforms. For example, waveform generator 501 may modulate the phase of the RF waveforms output by RF local oscillator 502 on a pulse-by-pulse basis, independently at each IF frequency, in accordance with the quadratic phase sequence defined in equation (1), and/or with separate values of the integer constant M used on different carriers. Such modulation may allow system 500 to determine nominal unambiguous range and nominal unambiguous Doppler shift of one or more targets.

The pulsed waveforms (or IF pulses) produced by generator 501 may be fed to mixer 503. The IF pulses may be combined in mixer 503 with a radio-frequency (RF) signal produced by the RF local oscillator 502 to create a microwave-frequency transmit or drive signal. The microwave-frequency drive signal may be filtered by filter 504 before being fed to radar amplifier 505. Amplifier 505 may amplify the drive signal, and feed the drive signal to circulator 506. Circulator 506 may then feed the drive signal to coupler 507. Coupler 507 may feed the drive signal to radar antenna 508. Radar antenna 508 then transmits the sequence of transmit pulses corresponding to the drive signal.

A sample port on directional coupler 507 may allow a sample of outgoing pulses (e.g., transmit pulses 516 corresponding to the drive signals) to be fed to mixer 513, along with the RF signal produced by local oscillator 502. Mixer 513 may produce a mixed IF sample signal from the drive signals from coupler 507 and the RF signal from oscillator 502. The mixed IF sample signal may be output from mixer 513. The mixed IF sample signal maybe input into IF digital receiver 514 to allow an optional implementation of pre-distortion corrections. The pre-distortion corrections may be fed from IF digital receiver 514 to waveform generator 501 to generate an IF waveform that improves a linearity of RF amplifier 505.

When multiple RF carriers are generated by radar system 500, unwanted carriers due to intermodulation distortion in the RF amplifier 505 may be produced. This may be avoided by using multiple (parallel) sets of waveform generators 501, mixers 503, filters 504, and amplifiers 505 (collectively referred to as an RF waveform generator 524 shown in FIG. 5), and summing the outputs of the multiple amplifier units in a high-linearity passive combiner 526, shown in dashed lines. The output of combiner 526 may then go to circulator 506. Such an approach may allow the use of high-efficiency saturated amplifiers 505, which if otherwise used in the architecture of FIG. 5 may cause serious or excessive intermodulation distortion, producing unwanted extra sidebands on the multiple carrier output, and thus potential spurious signals in the spectrum of the received signal.

The receiver portion of system 500, also referred to as a second electronic device, may be configured to receive reflected pulses 522 produced by reflection of plural transmit pulses 516 by each of one or more targets 520. Radar antenna 508 may receive one or more receive pulses 522 produced by reflection of transmit pulses 516 by each of one or more targets 520. The receiver portion of system 500 may further include coupler 507, circulator 506, LNA 509, mixer 510, local oscillator 502, and/or IF digital receiver 511. Receive pulses 522 (or signals) received by antenna 508 may pass through directional coupler 507 and may be fed to circulator 506, where the receive pulses may pass to LNA 509. LNA 509 may feed the amplified receive pulses to mixer 510. The RF signal produced by local oscillator 502 may also be fed to mixer 510, which may mix the receive pulses with the RF carrier signal to form an IF signal representative of the phases of the received pulses. The IF signal may be input to IF digital receiver 511.

IF digital receiver 511, described further below, may receive and digitize one or more IF channels of reflected signals. IF digital receiver 511 may filter each channel to establish the signal bandwidth. IF digital receiver 511 may modulate the phase of each IF pulse in each channel independently, according to the quadratic sequence defined in equation (1). IF digital receiver 511 may further demodulate the IF signal to a complex-baseband level (or time series). IF digital receiver 511 may output the complex-baseband time series to digital signal processor 512.

Digital signal processor 512 may be configured to produce from a sequence of the modulated receive pulses a first composite signal-frequency spectrum representative of a relationship of the transmit phase and the receive phase of each receive pulse 522. For example, the digital signal processor may be configured to determine from the first composite signal-frequency spectrum at least one parameter of a target that reflected the transmitted pulses. For example, signal processor 512 may implement one or more mathematical operations such as are described below, to derive one or more properties of the target, such as range, intensity, velocity, and/or other spectral characteristics from the complex-baseband time series. These radar products may then be output, such as to a graphical user interface for use by an operator, and or to a database. Digital signal processor 512 may be implemented in a field-programmable gate array (FPGA), software, or other appropriate form.

FIG. 6 shows an exemplary embodiment of IF waveform generator 501. IF waveform generator 501 may include a waveform synthesizer 601, a pre-distortion computation unit 602, a quadrature digital-to-analog (D/A) converter 603, a single side-band (SSB) quadrature up-converter mixer 604, a quadrature IF local oscillator 605, and an IF filter 606.

Waveform synthesizer 601 may be controlled by timing and control signals received from IF digital receiver 514 (see FIG. 5). The control signals received from IF digital receiver 514 may establish one or more pulse parameters such as PRF, pulse width, and/or carrier frequencies. Waveform synthesizer 601 may receive control signals from optional pre-distortion computation unit 602. Pre-distortion computation unit 602 may be responsive to the transmit sample and in-phase and quadrature (I/Q) data received from IF digital receiver 514 for producing control signals representative of changes in synthesized I/Q waveform produced by waveform synthesizer 601. The waveform synthesizer may then be responsive to these control signals to implement pre-distortion corrections to improve the linearity of RF amplifier 505 (see FIG. 5). The waveform synthesizer may produce carrier signals at a selected frequency, typically by direct digital conversion of stored or created digital waveforms, and may send the carrier signals in quadrature form to D/A converter 603.

Analog output from D/A converter 603 may then be input into SSB mixer 604 for up-converting the analog signal to an IF frequency. The other input to SSB mixer 604 may be provided by quadrature local IF oscillator 605, so that a single-sideband output may be produced from up-converter SSB mixer 604. SSB output from SSB mixer 604 may then be filtered by IF filter 606 for up-conversion to RF by mixer 503 (see FIG. 5).

If digital pre-distortion is to be used for linearizing radar power amplifier 505, then the sample of the output of amplifier 505, converted to a complex baseband time series by IF digital receiver 514, may be passed to pre-distortion computation unit 602. The output of unit 602 may pass to waveform synthesizer 601 in a form of adjustments to the waveform created by waveform synthesizer 601.

FIG. 7 shows an exemplary embodiment of an IF digital receiver, generally indicated at 700. IF digital receiver 700 may be an example of either of IF digital receivers 509 or 511. IF digital receiver 700 may include an IF filter 701, a high-speed A/D converter 702, one or more digital IF filters 703, a complex decimation element 704, and a per-channel phase control module 705.

The analog IF signal from mixer 510 or 513 (see FIG. 5) may be filtered by IF filter 701 and converted to digital format by high-speed A/D converter 702. The converter digital output from converter 702 may be passed in parallel to one or more digital IF filters 703, such as filters 703-1, 703-2, and 703-$k$, to establish the final RF bandwidth of radar system 500 (see FIG. 5) for each RF channel, such as channels 1, 2, and k, that are shown, where k may be an integer corresponding to the number of channels used. Digital filters 703 may implemented in hardware, firmware, and/or software.

Each IF channel may receive an input phase control signal from IF waveform generator 501 (see FIG. 5). The phase control signal may be based at least in part on data generated by the phase control module or other system controller.

An output of each digital IF filter 703 may be connected to complex decimation element 704. Complex decimation element 704 may be implemented in hardware, firmware, and/or software. The phase of the received signal in each channel may be independently adjusted, in accordance with the quadratic phase sequence described below, using the data provided to phase control module 705. This function may be performed by the respective digital IF filter, the respective complex decimation element, or a separate phase adjustment unit.

In complex decimation element (or stage) 704, the digital sequence in each channel may be decimated to produce a complex baseband output for transmission to digital signal processor 512 (see FIG. 5).

Digital signal processor 512 may be implemented in any appropriate digital processing system, such as a digital processing system including FPGAs or standard high-speed computing hardware, with algorithms defined in mathematical terms and implemented in firmware or software.

The generation of microwave signals, and/or the reception of those signals, may be facilitated by achieving desirable signal qualities, such as low phase noise, wide dynamic range, and low intermodulation distortion typical of radar systems built to a high standard.

In operation, system 100 or 500 may generate one or more channels of constant-PRF RF pulses whose phases are modulated with a quadratic sequence of the form of equation (1), with coefficients M and a specific to the operating parameters, producing nominal unambiguous range and velocity intervals according to equations (6)-(8). Multiple channels of data may be acquired sequentially in time, on multiple RF carriers, and/or on orthogonal polarizations.

Echoes from radar targets may be received on the same (or separate) antenna(s). The echoes may be substantially modulated by a quadratic phase sequence identical to that used to modulate each corresponding transmitter channel (though possibly displaced in time), to produce for each channel a time series of complex samples which may be converted by a Fourier transform (or another suitable method) to produce a composite signal-frequency spectrum for each channel. A sense of the phase modulation upon reception may be such that the total phase shift experienced by a given receiver sample is equal to the difference between the phase modulation applied to a signal representative of the phase of the received pulse at the time of reception and the phase modulation applied to the transmitter pulse at the time of transmission, as shown in equation (2).

Due to properties of the specific quadratic phase sequences involved, the frequency spectrum so produced for each channel may replicate the true RF spectra of all targets. Each target signal spectrum may be weighted by its respective amplitude. Each target spectrum may be shifted by its respective Doppler shift, and may be further shifted in frequency by a certain (or predetermined) frequency per range gate, as indicated by equation (4). In this manner, if plotted with the frequency axis as the abscissa and intensity at the ordinate, then the horizontal axis represents range, with an individual spectrum plotted at each range gate, and the spectrum shifted from its nominal place by any Doppler shift present at that range.

While the following continues to use the weather-radar case of distributed targets to exemplify the use of the apparatus, systems, and methods described herein in their preferred implementation, it will be appreciated that the apparatus, systems, and methods described herein may have applications to other types of radars or targets, to other types of electromagnetic or non-electromagnetic echo ranging, whether using coherent waves, or incoherent waves with coherent modulation, and to various combinations of bi-static and multi-static configurations.

The following describes various methods for detecting and/or parameterizing object echoes that are characterized by Doppler frequency shifts and/or Doppler spectra for various situations. One or more of these methods may be (or be included in) one or more frequency-domain processing alternatives for range-folded radar data. These methods may be enabled by one or more of the apparatuses (e.g., systems 100 and/or 500) and/or processes (e.g., producing a first composite signal-frequency spectrum) described above. FIGS. 8, 10, 12, 16, and 20 are flowcharts depicting examples of these methods, and may correspond to software and/or firmware designs. FIGS. 9, 11, 13-15, 17-19, and 21-23 are charts illustrating representative examples of various steps of these methods.

In the description below, an operation of forming a spectrum can be accomplished by any suitable method known to those familiar with the art, including forming the power spectrum by taking the squared absolute value of the Fourier transform of the baseband I/Q data sequence, suitably windowed to increase the dynamic range and resolution of the spectrum, with the data sequence length selected as appropriate to the measurements, irrespective of the value of the constant N.

In the description below, an operation of determining spectral parameters may refer to characterizing the spectral peaks as to echo range, echo intensity, echo Doppler shift, echo spectral width, and/or any other echo spectrum parameters which may be useful. This spectral estimation procedure can use one or more of the following exemplary data sets (A)-(D), among others, to characterize the spectrum for each range gate:

(A) A windowed portion of the overall spectrum, limited to the area around one range gate. Such a piece of the spectrum may contain one peak, a peak with a superimposed clutter peak, two blended peaks, and/or more complex features. Parameter extraction from power-spectrum peaks can be accomplished by direct moment estimation, fitting spectral features to Gaussian or parabolic curves by least squares and non-linear least squares, and many other approaches.

(B) An inverse Fourier transform of such a windowed portion of the power spectrum, which is equal to an auto-covariance function of that portion of the spectrum. Many approaches can be used to parameterize spectra from their auto-covariance functions, including the pulse-pair algorithm and various types of multi-pole spectral estimators.

(C) For each range gate, an inverse Fourier transform of a windowed portion of the complex Fourier transform of the complete time series. A suitable window may define a region of the complex spectrum of the time series including one particular gate, of which an inverse Fourier transform is equal to the time series, at time resolution T, which may permit the use of diverse approaches to parameterizing the spectral features at the gate in question from such time series.

(D) A windowed portion of the minimum spectrum, such as that exemplified in FIG. 18. This may be treated in the same way as an isolated peak would be treated, taking into account the reduction in signal intensity caused by the minimization function.

Figure 8:
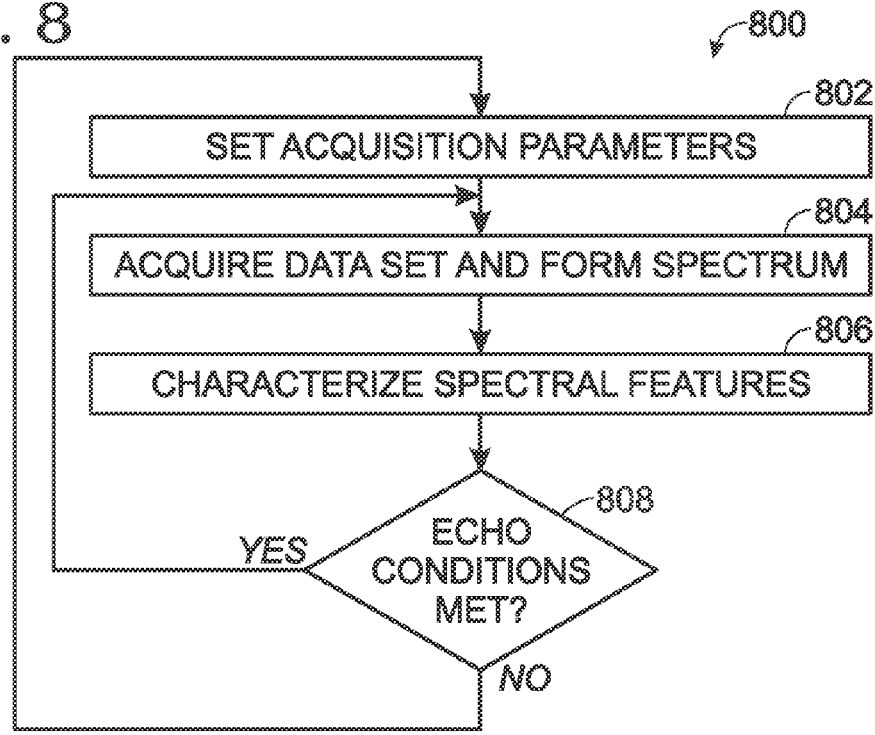
FIG. 8 is a flowchart depicting an example of a method of using either of the systems of FIG. 1 or 5.

An exemplary method (or algorithm), generally indicated at 800, is depicted in FIG. 8. Method 800 may be employed in a first exemplary situation in which an object echo spectral width may be less than dF in equation (8), and an absolute value of echo Doppler shift may be less than dF/2. In this first exemplary situation, the true range may not be ambiguous (e.g., may be unambiguous). However, in some embodiments, method 800 may be employed in other situations.

Method 800 may include a step 802 of setting one or more acquisition parameters. For example, step 802 may include setting a PRF of a sequence of pulses to be transmitted, setting a maximum range of those pulses (e.g., setting one or both of N and T), setting a gate width of one or more gates which may be included in one or more of the pulses, and/or setting M to a first integer value. For example, at step 802, system 500 may (or may be used to) set M equal to +1.

Method 800 may include a step 804 of acquiring a data set and forming a spectrum. For example, at step 804, the first electronic device of system 500 may generate plural transmit pulses having a common first frequency modulated with different transmit phases. The second electronic device of system 500 may receive reflected pulses produced by reflection of the plural transmit waves by one or more targets 520. The second electronic device may phase modulate a receive signal representative of a phase of the received reflected pulses with a receive phase corresponding to a phase of a currently generated transmit pulse. The receiver may produce from the modulated receive signals a first composite signal-frequency spectrum, an example of which is generally indicated at 900 in FIG. 9. Spectrum 900 may be representative of a relationship of the transmit phase and the receive phase of each receive pulse sequence. Spectrum 900 may be described as a range response of targets 520 presented in spectral form.

Method 800 may include a step 806 of determining from the formed spectrum at least one parameter of a first target 520. For example, spectrum 900 may be the range response for an exemplary configuration of 23 range gates (M=1, N=23), with targets at all 23 of those range gates, and with Doppler shifts of those targets in accordance with equation (8). Tick marks along the horizontal axis of FIG. 9 show nominal locations of echoes at zero Doppler shift, for each range gate. True target range, Doppler shift, echo intensity, echo spectral width, and other spectral details may be unambiguously measured from the spectrum, as shown by the annotations in FIG. 9. For example, system 500 may identify at least a first range spectral segment, such as a segment 902, with at least a first frequency local maximum M1 and a first spectral width W1. The first frequency local maximum of segment 902 may correspond with (or represent) an echo intensity of segment 902. The system may (then) determine from segment 902 a range R1, a velocity relative to the receiver device of the system (e.g., antenna 508), and a spectral width of a target over a range interval. For example, at step 806, the system may determine that a frequency of the received echo is approximately representative of the range (or distance) of the target from the receiver device. For example, the system may determine that the echo having maximum echo intensity M1 in segment 902 is at range R1 corresponding to range gate 3. The system may determine the velocity (relative to the transmitter and receiver devices) of the target at range R1 from a Doppler shift D1 of segment 902.

In some embodiments, at step 806, the system may determine one or more spectra parameters at a plurality of range gates, such as at each range gate. For example, the system may identify range spectral segments for each of range gates 1-23 in spectrum 900. The system may identify a local maximum and a spectral width for each of these segments. From each segment, the system may determine a range of a target (e.g., if an associated echo is present in the segment), the strength of the target echo, a velocity of the target relative to the receiver device of the system, and a spectral width of the echo from the target for a range interval corresponding to the segment.

Method 800 may include a step 808 of determining whether echo conditions have been met. For example, at step 808, the system may determine whether target echoes identified (and/or parameterized) at step 806 have respective spectral widths that are less than dF in equation (8), and respective absolute values of echo Doppler shift less than dF/2. If the system determines that the echo conditions have been met, then method 800 may return to step 804 and method 800 may be subsequently repeated, so as to track the targets. However, if the system determines at step 808 that the echo conditions have not been met, then the frequency of target echoes in spectrum 900 may not be representative of true range (e.g., one or more of the segments may be folded back into the spectrum and appear to be associated with a range gate with which the segment is not actually associated). Thus, if it is determined at step 808 that echo conditions have not been met, then method 800 may return to step 802 and the system may (or may be used to) reset or modify the acquisition parameters, and method 800 may be subsequently repeated.

In light of the above description, with reference to FIGS. 8 and 9 and other portions of this disclosure, it will be appreciated that a system and/or a computer program product may provide a method for using reflections of wave energy from one or more reflecting objects to characterize certain properties of these objects (e.g., the one or more reflecting objects) through the spectral characteristics of the reflections from them (e.g., the one or more reflecting objects). The method may include generating for transmission a repeating sequence of N constant-frequency pulses of width t seconds at interpulse intervals of T seconds, with each pulse in the sequence having a particular constant phase according to a quadratic phase sequence, which phase is applied to each pulse in a first sense of modulation.

The method may further include modulating the phase of echo energy received from one or more objects reflecting the transmitted repeating sequence of N constant-frequency pulses during each receiving subinterval by the identical quadratic phase sequence used for the transmitted repeating sequence of N constant-frequency pulses, with a second sense of modulation opposite to the first sense of modulation, so that the net phase modulation applied to echo energy reflected from a particular reflecting object at a particular range r, measured in discrete units of T of round-trip echo time, may be a difference between the phase of the transmitted pulses at the time of their transmission and the phase applied to the received echo energy from range r, in either sense of the difference.

The method may further include producing from the modulated received echo energy N unique and discrete frequency translations of the received echo energy as a function of range r of the reflecting objects, of magnitude equal to multiples of 1/NT Hz, which frequency translations may preserve the spectrum of the received echo energy, forming in combination a composite signal frequency spectrum.

The quadratic phase sequence may be represented by $\phi(n)=M(an^2+bn+c)$, where $\phi(n)$ may be the phase applied to a pulse having pulse index n. M may be an integer constant having no common factors with N. Pulse index n may be the index of pulses in the repeating sequence in the range 1 to N. The coefficient a may be a constant defining the repeating interval of the phase sequence, when considered modulo one rotation of phase, set to $\pi/N$ for phase units of radians. The coefficients b and c may be constants of any value.

In some embodiments, producing N frequency translations may include producing a frequency translation of the received echo energy as a function of range r of the form $Ma(r-i)/NT$ Hz modulo 1/T Hz, where the index i may represent any index offset in n between the application of $\phi(n)$ to the generated pulse, and the application of $\phi(n)$ to the received echo energy.

In some embodiments, the method may further comprise determining that one or more spectral features of the received echo energy for a sequence of transmitted pulses having phases generated using a single value of the constant M fall within a spectral interval of 1/NT Hz for each respective range r, without spectral overlap.

In some embodiments, the method may further comprise characterizing unambiguously spectral features of the corresponding received echo energy from each range r, and assigning the characterized spectral features to a particular range.

In some embodiments, limits on maximum Doppler shift can be relaxed by operating the radar (of either of systems 100 or 500) in two modes, either sequentially in time, or in parallel using two different carrier frequencies, or by using two orthogonal polarizations (which may involve two transmitter-receiver systems of the type shown in FIG. 5). For example, either of systems 100 or 500 may be configured to generate a first sequence of transmit pulses according to the quadratic function of equation (1) with M set equal to a first integer value, and to generate a second sequence of transmit pulses according to the quadratic function of equation (1) with M set equal to a second integer value that is the negative of the first integer value. Additionally, either of systems 100 or 500 (e.g., either of processors 119 or 512) may be configured to determine a Doppler shift of a target from a difference in the respective composite signal-frequency spectra for the first and second sequences of transmit pulses for the target (e.g., with the first sequence generated with M set equal to the first integer value, and the second sequence generated with M set equal to the second integer value). For example, one set of data may be taken with the integer constant M in equation (1) set to +1, and the other with M set to −1. This change in M may reverse the relationship between the sign of the Doppler shift and the sign of the frequency shift produced by the phase sequence, since a positive Doppler shift for M=+1 will correspond to a positive Doppler shift for M=−1, but the sign of the phase-sequence-induced frequency shift will change.

Figure 10:
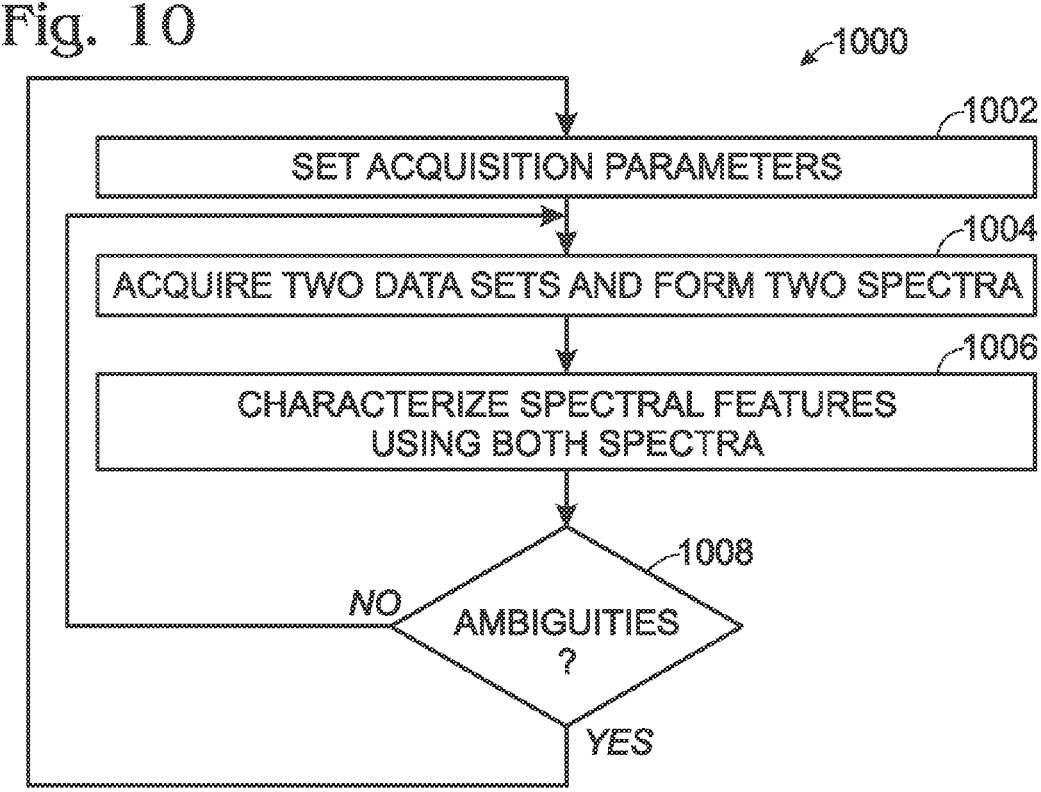
FIG. 10 is a flowchart depicting another example of a method of using either of the systems of FIG. 1 or 5.

For example, a method, generally indicated at 1000 in FIG. 10, may be implemented if the one or more targets do not satisfy the echo conditions of method 800. For example, in a second exemplary situation, targets may not meet the strong unambiguous Doppler criterion of the first exemplary situation described above (e.g., target echo spectral width may not be less than dF in equation (8), and an absolute value of echo Doppler shift may not be less than dF/2). Rather, the targets may have Doppler shifts less than about two or three times that criterion. Additionally and/or alternatively, the targets may have some continuity in range, so that they do not overlap in the spectra. Method 1000 may also be used in other suitable situations, such as a situation in which it is desired to validate target parameters determined with method 800.

Method 1000 may include a step 1002 of setting acquisition parameters of the system. For example, step 1002 may involve setting PRF of first and second sequences of pulses to be transmitted, setting a maximum range of those pulses (e.g., setting one or both of N and T), setting a gate width of one or more gates which may be included in the first and second sequences, setting M to a first integer value for the first sequence of pulses, and/or setting M to a second integer value for the second sequence of pulses. The second integer value may be the negative of the first integer value. For example, at step 1002, the system may (or may be used to) set M equal to +1 for the first sequence of pulses, and M equal to −1 for the second sequence of pulses. Such a setting may be represented as M=[+1, −1].

Method 1000 may include a step 1004 of acquiring two data sets and forming two spectra. For example, at step 1004, the first electronic device of the system may generate plural transmit pulses having a common first frequency modulated with different transmit phases. The plural transmit pulses may include the first sequence of transmit pulses determined at least in part according to a first value (e.g., +1) of a first factor (e.g., M), and a second sequence of transmit pulses determined at least in part according to the negative of the first value (e.g., −1) of the first factor. The receiver of system 500 may receive reflected pulses produced by reflection of the plural transmit pulses by the one or more targets. The receiver may phase modulate the received reflected pulses with a receive phase corresponding to a phase of a currently generated transmit pulse. The receiver may produce from the modulated receive pulses first and second composite signal-frequency spectra, examples of which are respectively generally indicated at 1100, 1102 in FIG. 11. First spectrum 1100 may be representative of a relationship of the transmit phase and the receive phase of each receive pulse corresponding to the first sequence (with M=+1). Second spectrum 1102 may be representative of a relationship of the transmit phase and the receive phase of each receive pulse corresponding to the second sequence (with M=−1). Spectra 1100, 1102 may be described as a range response of targets presented in spectral form.

The added degrees of freedom provided by data obtained with M set equal to the first integer value and with M set equal to the second integer value (e.g., M=+1 and M=−1) may make it possible for either of the processors of systems 100 or 500 to resolve ambiguities caused by moderate overlapping of Doppler-shifted signal spectra, over many or all range gates, or more substantial overlapping of such spectra in a minority of range gates. In this way, the limit on unambiguous Doppler shift, or target radial velocity, may be substantially relaxed as compared to the pre-existing limit for Doppler radars.

Spectra 1100, 1102 are examples of using these two values (e.g., +1, −1) of M. In FIG. 11, the two spectra are plotted, one inverted for comparison with the other, both in amplitude and frequency (with the M=−1 sequence producing frequency shifts that are the substantial negative of frequency shifts of the M=+1 sequence). In this case, some of the Doppler shifts are well in excess of the constraint provided by equation (8), but it remains possible to identify the true range and Doppler shift (and other parameters) for each echo spectrum, because the echo spectra occur in pairs, with the average frequency between the pairs falling at the range markers defined by Equation 4 indicating the true range, and half the difference in the frequencies of the two peaks indicating the true Doppler shift. In FIG. 11, dashed lines connect corresponding pairs of spectral peaks. For example, it is clear that the first two peaks (corresponding respectively to range gates 1 and 2) have nearby pairs, as the Doppler shifts associated with these peaks are small. In addition, peaks 1104, 1106 corresponding to range gate 4, connected by dashed lines, are also a pair, though the Doppler shift of these peaks violates equation (8) by a large margin. As shown in FIG. 11, the two peaks corresponding to range gate 4 are symmetrically displaced from their true range, the fourth tick mark (e.g., corresponding to range gate 4).

Method 1000 (see FIG. 10) may include a step 1006 of determining one or more target parameters using both of the spectra formed at step 1004. For example, at step 1006, the system may determine the Doppler shift associated with a target (e.g., one or more of targets 520) from a difference in spectra 1100, 1102 for the respective first and second sequences of transmit pulses for the target. For example, at step 1006, the system may perform one or more determinations (and/or parameterizations) on spectra 1100, 1102 in a manner similar to one or more of those performed at step 806 of method 800 (see FIG. 8). For example, the system may identify a frequency (or location) of echo peak 1104 in spectrum 1100, and a frequency (or location) of echo peak 1106 in spectrum 1102. The system may determine that echo peaks 1104, 1106 occupy related positions (or locations) in respective spectra 1100, 1102. For example, the system may determine that peaks 1104, 1106 are located in corresponding spectra segments or are both located in similar positions in respective peak orders in the respective spectra (e.g., peaks 1104, 1106 are both fourth peaks). The system may associate the related positions of related peaks 1104, 1106 with a common target (e.g., reflective object). The system may pair related peaks 1104, 1106. The system may determine a range of the common target by averaging the respective frequencies of related peaks 1104, 1106, and associating this averaged frequency with the range of the common target. For example, the system may determine that the common target associated (or corresponding) with peaks 1104, 1106 reflected an echo having an average frequency that is approximately equal to the frequency corresponding to range gate 4. Based on this determination of true range, the system may determine the Doppler shift associated with the common target from either of spectra 1100, 1102. The system may similarly determine one or more target parameters at each range gate by similarly pairing associated features for each range gate.

As described above, two values of M may be used in method 1000 to resolve range ambiguities. Pairs of spectra symmetrically located about each range gate zero-Doppler point may be found. A separation in frequency between two peaks may be twice the Doppler shift. The average frequency (of the two peaks) may be indicative of the true range.

Method 1000 may include a step 1008 of determining whether any ambiguities remain in the spectra. Remaining ambiguities may include ambiguous spectral features, such as an echo peak having a spectral width greater than dF/2. Such a wide spectral width may include a plurality of ambiguous echo peaks from a plurality of range gates, with the ambiguous echo peaks ambiguously Doppler shifted toward one another in the spectrum. At step 1008, if the system determines that no ambiguities remain, then method 1000 may return to step 1004 and continue acquiring data for continuing target parameterization. However, if at step 1008 the system determines that ambiguities do remain, then method 1000 may return to step 1002 and the system may (or may be used to) reset, modify, and/or adjust the acquisition parameters, and method 1000 may be subsequently repeated. Alternatively and/or additionally, a method, generally indicated at 1200 in FIG. 12, may be implemented if it is determined that ambiguities remain.

For example, in a third exemplary case or situation, one or more spectra produced by the system may have moderate to strong spectral overlap, and/or large spectral widths. FIG. 13 shows an example of such a spectrum for range gates 1-23. In FIG. 13, the spectra for range gates 17-20 overlap to the point where no information can be extracted about the signals except rough estimates of the intensity and range of a group of echoes. Such overlapped echoes may be resolved by acquisition of further data sets. The further data sets may be taken sequentially in time or in parallel, with multiple frequency carriers, with orthogonal polarizations, and/or with various values of the integer constant M. By acquiring further data sets with different M values, the range gates may be rearranged or permuted in the spectrum in a predetermined manner, which may separate spectral peaks for characterization.

For example, method 1200 (see FIG. 12) may include a step 1202 of setting one or more acquisition parameters of the system. At step 1202, the system may set the PRF of a plurality of sequences of pulses to be transmitted, set a maximum range of those pulses (e.g., setting one or both of N and T), set a gate width of one or more gates which may be included in the plurality of sequences, and/or select a set of m values of M, where m may be the number of sequences to be transmitted. For example, at step 1202, the system may be configured to generate a plurality of sequences of transmit pulses according to the quadratic function of equation (1), with each sequence having a different integer value of M. For example, at step 1202, the system may be configured to generate a first sequence with M=+1, and a second sequence with M=+7 (e.g., m=2, with M=[+1, +7]). In some embodiments, the system may set the acquisition parameters for the second sequence after transmission of the first sequence, after the spectrum has been formed for the first sequence, and/or after the system has determined that the spectrum for the first sequence includes ambiguous spectral peaks.

Method 1200 may include a step 1204 of acquiring m data sets and forming m spectra. For example, at step 1204, a transmitter of the system may generate plural transmit pulses having a common first frequency modulated with different transmit phases. The plural transmit pulses may include the first sequence of transmit pulses with M=+1, and a second sequence of transmit pulses with M=+7. A receiver of the system may receive reflected pulses produced by reflection of the plural transmit pulses by one or more reflective targets in the transmission medium. The receiver may phase modulate the received reflected pulses with a receive phase corresponding to a phase of a currently generated transmit pulse. The receiver may produce from the modulated receive pulses a first composite signal-frequency spectrum (e.g., spectrum 1300 shown in FIG. 13), based on the phase change signals, for received pulses corresponding to the first sequence of transmit pulses with M=+1, and a second composite signal-frequency spectrum (e.g., spectrum 1400 shown in FIG. 14) for received pulses corresponding to the second sequence of transmit pulses with M=+7.

As shown in FIGS. 13 and 14, different integer values of M may redistribute an order in which the range gates are distributed in the spectrum compared to the order in which the range gates are distributed in the spectrum produced by other sequences of transmit pulses.

For example, provided that M and N share no common factors (which may suggest an advantage for N being a prime number), changing the value of M may change the order of the range gates in the frequency spectrum, without changing any other characteristics of the individual spectra (except the relationships between the sign of Doppler shifts and spectral shifts caused by the phase sequence, which are inverted by positive and negative values of M). In some embodiments, either of systems 100 or 500 may be configured to select a value for M that does not have a common factor with N, which may prevent any of the range gates from overlapping in the redistributed order.

For instance, with N=23 range gates (as in FIGS. 13 and 14), changing M from +1 to +7 changes the spectral range order (or spectral order of range gates) from r=1, 2, 3, . . . 23 in the spectrum to r=10, 20, 7, . . . 23, according to the relationship shown in equation (9).

$$rj = M*ri \text{ modulus } N \quad \text{Equation (9)}$$

In equation (9), ri are the original spectral indexes in linear order for M=1, and rj are the spectral indexes for the same targets for other values of M.

In this way, spectrum 1400 shown in FIG. 14 shows the spectrum for the same targets (or objects) as shown in FIG. 13, but with the range sequence redistributed (or re-ordered) using M=7. The peaks in FIG. 14 are associated with range gates 1-23 according to the true ranges, showing the permutation in a rearranged range order. The peaks corresponding to range gates 17, 18, 19, 20 are now well separated, and their properties can be characterized (e.g., estimated and/or determined).

For example, method 1200 may include a step 1206 of determining one or more target parameters from one or more of the formed spectra. At step 1206, for each of the m spectra, the system may characterize spectral peaks which can be resolved without ambiguity for that value of M. Spectral peaks which cannot be resolved and parameterized for one value of M may be so resolved and characterized for another value of M. In this way, by treating the m spectra, the system may identify the true range for each resolved spectral peak.

Once (or after) a spectral peak has been characterized (e.g., with its true range), that spectral peak (or feature) may be removed from the formed spectra for all values of M by subtraction or other means.

In some embodiments, at step 1206, the system may identify spectra (or spectral segments) in each of spectra 1300, 1400 which are sufficiently isolated from the spectra (or spectral segments) for other range gates that the corresponding parameters of amplitude, Doppler shift, and spectral width can be determined directly. At step 1206, the system may (then) determine for one or more of spectra 1300, 1400 the parameters for one or more of range gates 1-23. For example, in spectrum 1300 of FIG. 13, the system may identify that the peaks for the spectral segments corresponding to range gates 1-16, 21, 22 are sufficiently isolated from one another, but that the spectral segments for range gates 17-20 are not sufficiently isolated from one another (but rather, are overlapped). However, the system may identify that in spectrum 1400 of FIG. 14 the spectral segments for range gates 17-20 are sufficiently isolated from one another (and the other spectral segments). The system may then determine one or more target parameters from peaks for range gates 1-16, 21, and 22 from spectrum 1300, and one or more target parameters from peaks for range gates 17-20 from spectrum 1400. In this manner, the ambiguous peak corresponding to range gates 17-20 may be resolved. The degree of success in this process may depend upon the percentage of range gates with significant echo energy.

Figure 12:
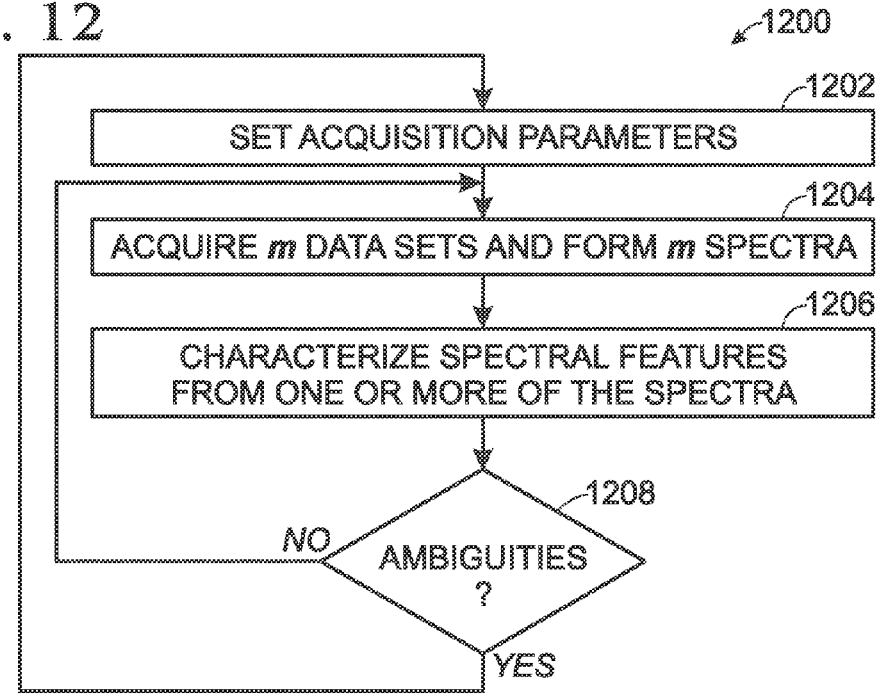
FIG. 12 is a flowchart depicting another example of a method of using either of the systems of FIG. 1 or 5.

In light of the above description, with reference to FIGS. 12-14 and other portions of this disclosure, a system and/or a computer program product may provide a method that includes determining that the spectral features of the received echo energy from one or more of the at least one or more reflecting objects fall outside a spectral interval of 1/NT Hz for one or more of the respective ranges, or spectral features of the received echo energy from differing ranges overlap.

In some embodiments, the method may include, where there is an ambiguity in the assignment of range to spectral features in the echo energy spectrum, generating a repeating sequence of N constant-frequency pulses using plural values of the constant M.

The method may further comprise determining parameters of spectral features of the corresponding received echo energy to disambiguate shifted or overlapping spectral features by finding, for each range r, at least one value of the constant M for which any such shift or overlap may be resolved through permutations of spectral range order produced by differing values of M. In some embodiments, the method may include characterizing spectral features of the received echo energy from each range r having overlapping or shifted spectral features. In some embodiments, the method may include assigning the characterized spectral features to a particular range.

Referring back to FIG. 12, at step 1206, the system may remove the spectra for those range gates for which the parameters were determined from the plurality of composite signal-frequency spectra (e.g., spectra 1300, 1400). For example, from spectrum 1300 the system may determine parameters for target echoes from the respective spectral segments for range gates 1-16, 21, 22, and may then subtract the spectral segments for these echoes from the corresponding range gates in spectrum 1400. This may prevent peaks 17-20 from being ambiguously mixed with other peaks when rearranged by the other value of M.

For example, ambiguities in either of spectra 1300, 1400 may be resolved by using (or identifying) the locations and properties of the peaks already resolved in the M=1 case. In FIG. 13, peaks 1-16, 21, 22 can be resolved, and using equation (9) the system can determine where these peaks lie for the case of M=7. This has been done in FIG. 15, where a modified spectrum based on spectrum 1300 containing the resolved peaks 1-16, 21, 22 but not containing the unresolved peaks 17-20 have been plotted with dashed lines at their M=7 locations in the spectrum. A second modified spectrum corresponding to spectrum 1400 presented in FIG. 14 for only peaks 17-20 is shown in solid lines in FIG. 15.

Figure 15:
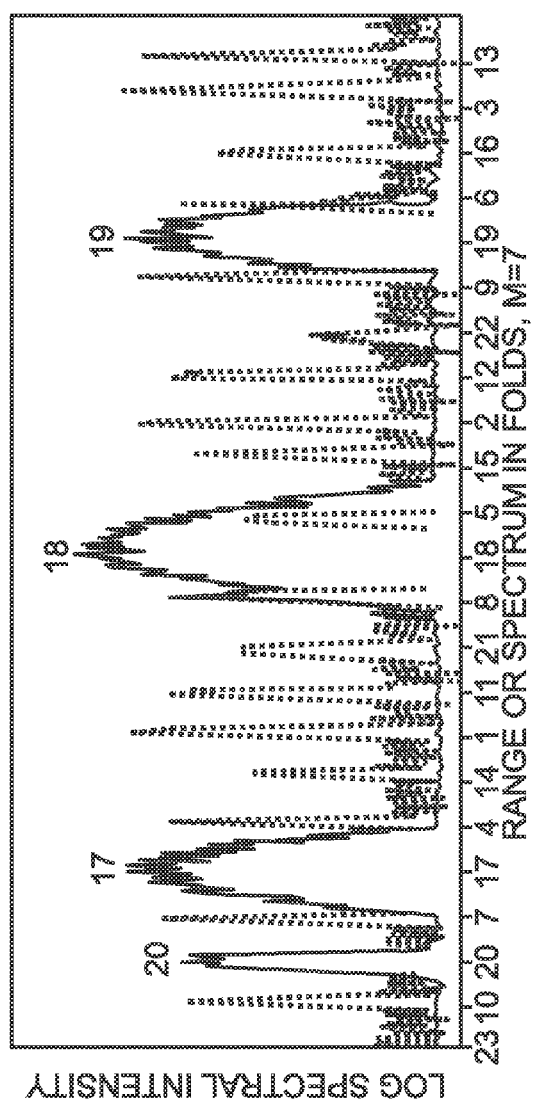
FIG. 15 is another chart which may be produced by the method of FIG. 12, illustrating an example of range response for the situation illustrated in FIG. 14, with spectral peaks which could be parameterized from the spectrum of FIG. 13 removed (removal shown in dashed lines), with four remaining spectral peaks, from ranges 17-20, ready for parameterization.

The modified spectrum based on reconstructed data from FIG. 13, shown in dashed lines, overlays well with data in FIG. 15 for peaks 17-20 from spectrum 1400, shown in solid lines, aside from statistical differences due to the two data sets being incoherent, since the two data sets may have been taken at different carrier frequencies, or different times, or at different polarizations.

In FIG. 15, there are four peaks from FIG. 14, shown in solid lines, which do not have overlying peaks, since the resolved peaks from spectrum 1300 have been removed from the data. The four peaks 17, 18, 19, 20, shown in solid lines occur where the reconstruction of the modified spectrum from FIG. 13 shows essentially no energy.

Peaks 17, 18, 19, 20 can now be parameterized (by the system) from their respective isolated spectra. Parameterizing peaks 17, 18, 19, 20 may involve subtracting slightly interfering peaks resolved from spectrum 1300. However, such subtraction may not be complete for statistical reasons. For example, the spectra may not be coherent, either due to sequential acquisition, or acquisition at differing carrier frequencies or polarizations.

It is thus seen that at step 1206, the system may determine whether the parameters for any remaining undetermined range gates may be determined. For example, the amplitudes of the spectra for the range gates may have spectral local maximums, and step 1206 may include for each spectral local maximum for which one or more parameters has not been determined, selecting one of the plurality of composite signal-frequency spectra from two or more range gates that are overlapping and for which each spectral local maximum has been determined. As discussed above, the system may identify that spectral local maximum for range gates 17-20 were not determined (or determinable) from spectrum 1300. In response to this identification, the system may select spectrum 1400 in which range gates 17-20 have been rearranged so that these range gates are not directly adjacent to one another, but rather have multiple other range gates there between.

At step 1206, the system may perform a multi-maximum determination using a selected computational module using the known parameters of the range gates having overlapping spectra as initial conditions. For example, performing the multi-maximum determination may include using a nonlinear least squares model, a Gaussian model, a log-Gaussian model, or a parabolic model.

However, if there remain range gates having parameters that remain undetermined and one or more parameters were determined after performing the multi-maximum determination, then step 1206 may include removing the range spectral segments for one or more range gates from the composite signal-frequency spectra for which the parameters were determined, and performing a multi-maximum determination on the composite signal-frequency spectra from which range spectral segments have been removed using a selected computation model using the known parameters of the range gates having overlapping range spectral segments as initial conditions. For example, at step 1206, the system may remove from spectrum 1400 the spectral segments that are shown in dashed lines in FIG. 15. For example, the spectral parameters for these dashed spectral segments may have been determined from spectrum 1300, and by subtracting them (or the associated spectral segments) from spectrum 1400, the target parameters for range gates 17-20 may be more easily determined from spectrum 1400 with the resolved peaks removed.

In some embodiments, the range gates in each composite signal-frequency spectrum for a given value of M may be disposed in a spectrum sequence, and method 1200 may include selecting values of M that provide mixing of range gates in the spectrum sequence, and producing a respective composite signal-frequency spectrum for each value of M. For example, the system may be configured to produce spectrum 1300 for M=+1, and to produce spectrum 1400 for M=+7, as described above.

In some embodiments, the values of M may be selected to provide increased mixing of range spectral segments for ranges that are determined to be less occupied than the range spectral segments for other ranges. For example, if range spectral segments for range gates 5-10 did not include as many echoes as range spectral segments for range gates 11-14, then the values of M may be selected (e.g., by the system) to provide more mixing of range spectral segments for range gates 5-10, and less mixing of range spectral segments for range gates 11-14.

Method 1200 may include a step 1208 of determining whether any ambiguities remain in the spectra. If it is determined at step 1208 that ambiguities do not remain in the spectra (e.g., that all of the spectral segments for all of the range gates have been resolved and/or characterized), then method 1200 may return to step 1204, for subsequent acquisition of data sets and formation of spectra to continue target parameterization. However, if it is determined at step 1208 that one or more ambiguities do remain, then method 1200 may return to step 1202 and the acquisition parameters may be changed and steps of method 1200 repeated.

In light of the above description, with reference to FIGS. 12-15 and other portions of this disclosure, it will be appreciated that a system and/or a computer program product may provide a method wherein characterizing spectral features of the received echo energy having overlapping or shifted spectral features may include acquiring spectra for m plural values of the constant M. Characterizing the spectral features may further include characterizing for any ranges r those spectral features which can be assigned unambiguously as to range from any of the m spectra. Characterizing the spectral features may further include subtracting the spectral features so characterized for each corresponding range r from each of the m spectra, at the respective spectral location for the feature for each value of M. Characterizing the spectral features may further include repeating the preceding two steps (e.g., the step of characterizing for any ranges, and the step of subtracting the spectral features) with the modified spectra for remaining spectral features.

Referring back to FIG. 12, in method 1200, changing (or altering) range order of the spectra, through changes in M, can resolve resulting ambiguities in many cases. For example, the resulting ambiguities may be resolved by finding one or more values of M for which a given spectrum is free from overlapping spectra. However, if method 1200 does not resolve all ambiguities (or most of the ambiguities), then method 1600 depicted in FIG. 16 may be more appropriate.

For example, in a fourth exemplary case or situation, spectra may have moderate to very strong spectral overlap, and/or very large spectral widths. In this fourth exemplary situation, using a moderate to large number of values of M, and processing each range gate by overlaying all spectra aligned to be in register only for that range gate, may allow the minimum of an ensemble (or overlay) of spectra to reveal true range, Doppler shift, and/or one or more other spectral properties of the echo from that range gate. The degree to which disambiguation of true range, Doppler shift, and/or the one or more other spectral properties is successful may depend upon the number of values of M used, and a fraction of the range gates with significant echo intensity.

An approach to (or process for) disambiguating overlaid spectra, particularly for very wide spectra or spectra with large Doppler shifts and when spectra are available for a number of values of M, may operate in the following manner. The spectra for all or a plurality of values of M (for which data is available) may be computed. Then, for each range gate, the various spectra may be individually shifted in frequency by appropriate multiples of 2a/T Hz, so that the spectral peaks from the range gate being processed may all line up, for example, at their respective positions when M=1. The amount by which each spectrum is shifted may be derived from equation (8) and the value of M for that spectrum. As spectral estimates move beyond one end of the [0, 1/T] unambiguous range, they are in effect circularly shifted and enter the opposite end of the unambiguous range. A minimum value of this ensemble of circularly shifted spectra, for each frequency in the spectrum, may then be taken as an approximation of the true spectrum. The accuracy of the spectrum may increase with the number of values of M available.

Figure 16:
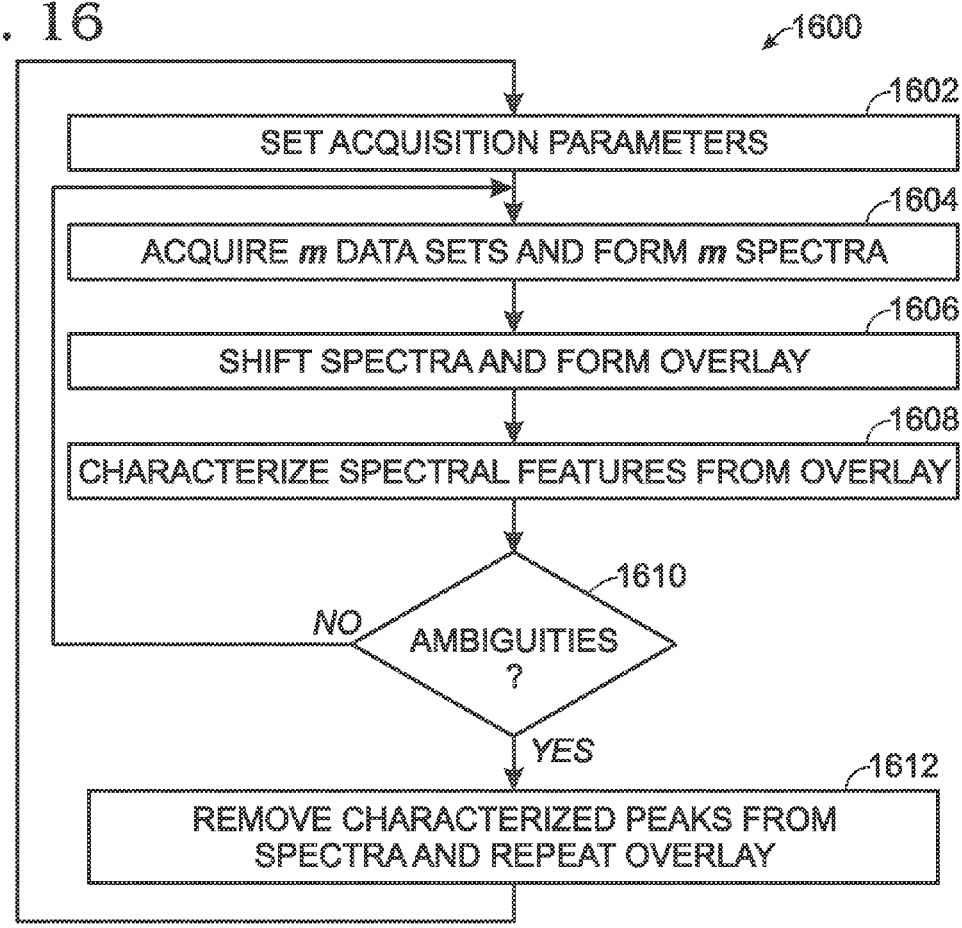
FIG. 16 is a flowchart depicting another example of a method of using either of the systems of FIG. 1 or 5.

Method 1600 depicted in FIG. 16 is an example of such a method. At a step 1602, acquisition parameters of the system may be set in a manner similar to step 1202 of method 1200. For example, at step 1602 the system may set PRF, maximum, gate width, and/or select m values of M. In method 1600, m may be an integer greater than or equal to 2, and preferably much greater than 2.

At a step 1604, the system may acquire m data sets and form m spectra, for example, in a manner similar to that of step 1204 of method 1200. However, at step 1604, a larger number of data sets and spectra may be formed than at step 1204.

At a step 1606, the system may shift the spectra and form an overlay of the shifted spectra. For example, for each range gate, the system may shift (or translate the frequency of) the m spectra so that the m spectra are aligned at a zero-Doppler point (or shift) for that range gate. For each range gate, the system may form an overlay or minimum spectrum of the shifted spectra for the respective range gate.

Figure 17:
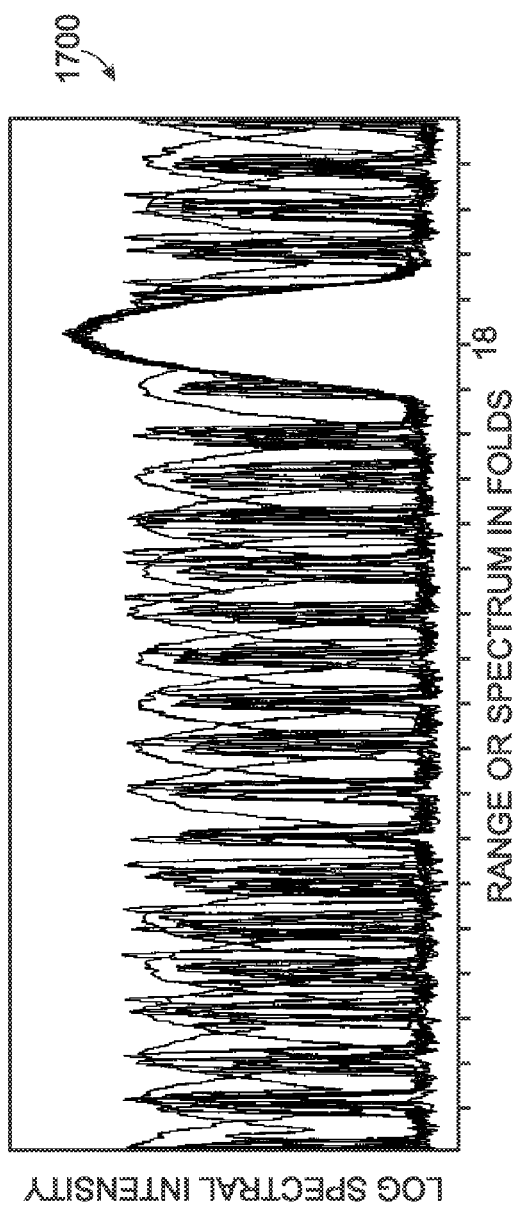
FIG. 17 is a chart which may be produced by the method of FIG. 16, illustrating an example of range response for data from FIG. 13, with spectra for several values of a parameter M overlaid, each spectrum shifted so that spectral values for range gate 18 are aligned at the position of gate 18 for M=1.

FIG. 17 shows an example of one such overlay, generally indicated at 1700, for range gate 18, with the m spectra shifted such that range gate 18 in each of the m spectra is aligned at range gate 18 for the M=1 case. In FIG. 17, overlay 1700 includes spectra 1300, 1400, as well as additional spectra with other values of M, with the spectra shifted, as required, such that all of their respective spectral segments for range gate 18 are aligned at a common position, such as at the position of range gate 18 for the spectrum corresponding to the M=1 case. In other words, FIG. 17 shows such an approach for disambiguating overlaid spectra as described above, applied to the example situation used in FIGS. 13-15, with separate reconstructions of the spectra for several values of M overlaid, but shifted to match at range gate 18. Due to the orthogonal nature of the quadratic phase sequence, spectra from range gates other than 18 may be in different positions in the plot for each value of M. As a result, overlay 1700 may be used to disambiguate parameters associated with range gate 18, as will be described below. As described above, at step 1606, an overlay for each of the range gates may be formed (e.g., for each value of r).

At step 1608, the system may determine one or more target parameters from one or more of the overlays formed at step 1606. For example, the system may be configured to form a minimum (or minimum ensemble) of each of the overlays, and identify a resulting peak within a predefined Doppler shift window as a target echo, and determine the associated Doppler shift and spectral properties of that target from the resulting peak.

For example, a minimum ensemble (or minimum value) of spectra plotted in FIG. 17 is shown in FIG. 18, and generally indicated at 1800. The result is an approximation of the true spectrum of the signal at gate 18, biased slightly lower in intensity by the operation of finding the minimum of the sum of several realizations of the spectrum.

In some embodiments, this process may include finding (or determining) parameters (or estimates) from the other range gates, and plotting the resulting spectra (or peaks) for all of the gates, as is shown in FIG. 19. In FIG. 19, resulting peaks, including those for the other three range gates that are overlapping in FIG. 13 (i.e., range gates 17, 19, and 20), have been formed using the same method as described above (e.g., shifting spectra into alignment for the respective range gate, forming an overlay, and taking a minimum of the overlay). Parameters of all 23 gates can now be determined successfully (e.g., by the system). The degree to which this process can succeed may depend upon the number of values of M for which data is available, the width of the Doppler shift search window, and the percentage of range gates for which significant echoes are present.

Method 1600 (see FIG. 16) may include a step 1610 of determining whether any ambiguities remain. For example, at step 1610, the system may determine whether any ambiguities remain in any of the formed spectra, formed overlays, and/or formed minimums of those overlays. If it is determined at step 1610 that ambiguities do not remain, then method 1600 may return to step 1604 for subsequent acquisition of data sets and formation of spectra to continue parameterization of reflective targets in the transmission medium.

However, if it is determined at step 1610 that ambiguities do remain, then method 1600 may proceed to a step 1612. At step 1612, the system may be configured to remove one or more characterized peaks (e.g., peaks for which target parameters can be determined directly, for example, as in FIG. 9) from the m spectra, and repeat one or more of the overlays. For example, if it is determined at step 1610 that ambiguities remain at range gates 17 and 19, then at step 1610, the system may remove characterized peaks from the m spectra. The system may then repeat the overlays for those range gates (i.e., 17 and 19), but in some embodiments, may not repeat overlays for the other range gates for which it has been determined that no ambiguities remain.

In light of the above description, with reference to FIGS. 16-18 and other portions of this disclosure, it will be appreciated that a system and/or a computer program product may provide a method wherein characterizing spectral features of the received echo energy having overlapping or shifted spectral features from differing range intervals r may include acquiring spectra for m plural values of the constant M, and performing one or more of the following steps (a)-(c) for each range r. Step (a) may include shifting the acquired m spectra circularly, so that they (e.g., the acquired m spectra) align at the point in each spectrum where received echo energy at zero Doppler velocity from that range r would lie. Step (b) may include creating a minimum spectrum by taking, for each frequency in the aligned spectra, the minimum value at that frequency from an ensemble of aligned spectra. Step (c) may include characterizing any spectral features in the minimum spectrum exceeding a preset threshold value and located within a predetermined frequency window as representing the spectral features for one or more objects at range r.

Referring back to FIG. 16, in method 1600, individual spectral features may be resolved in any range order desired. However, in some cases it may be more appropriate to resolve spectral features in the order of their spectral energy, and a method 2000 depicted in FIG. 20 may be more appropriate.

For example, in a fifth exemplary case or situation, spectra may be determined to have moderate to very strong spectral overlap, Doppler shifts, and/or very large spectral widths. In this fifth exemplary situation processing the spectral features in order of some measure of spectral energy includes, for each range r, performing the method 1600 using a moderate to large number of values of M and forming a measure of the spectral energy of a spectral feature for that range r. The spectral feature for the range r having the strongest measure of spectral energy is characterized and the feature is then subtracted from the spectra for all values of M. The process is then repeated using the modified spectra, until the energy remaining in the spectra is below a pre-set threshold of significance. The degree to which disambiguation of true range, Doppler shift, and/or one or more other spectral properties is successful may depend upon the number of values of M used, and a fraction of the range gates with significant echo intensity.

Figure 20:
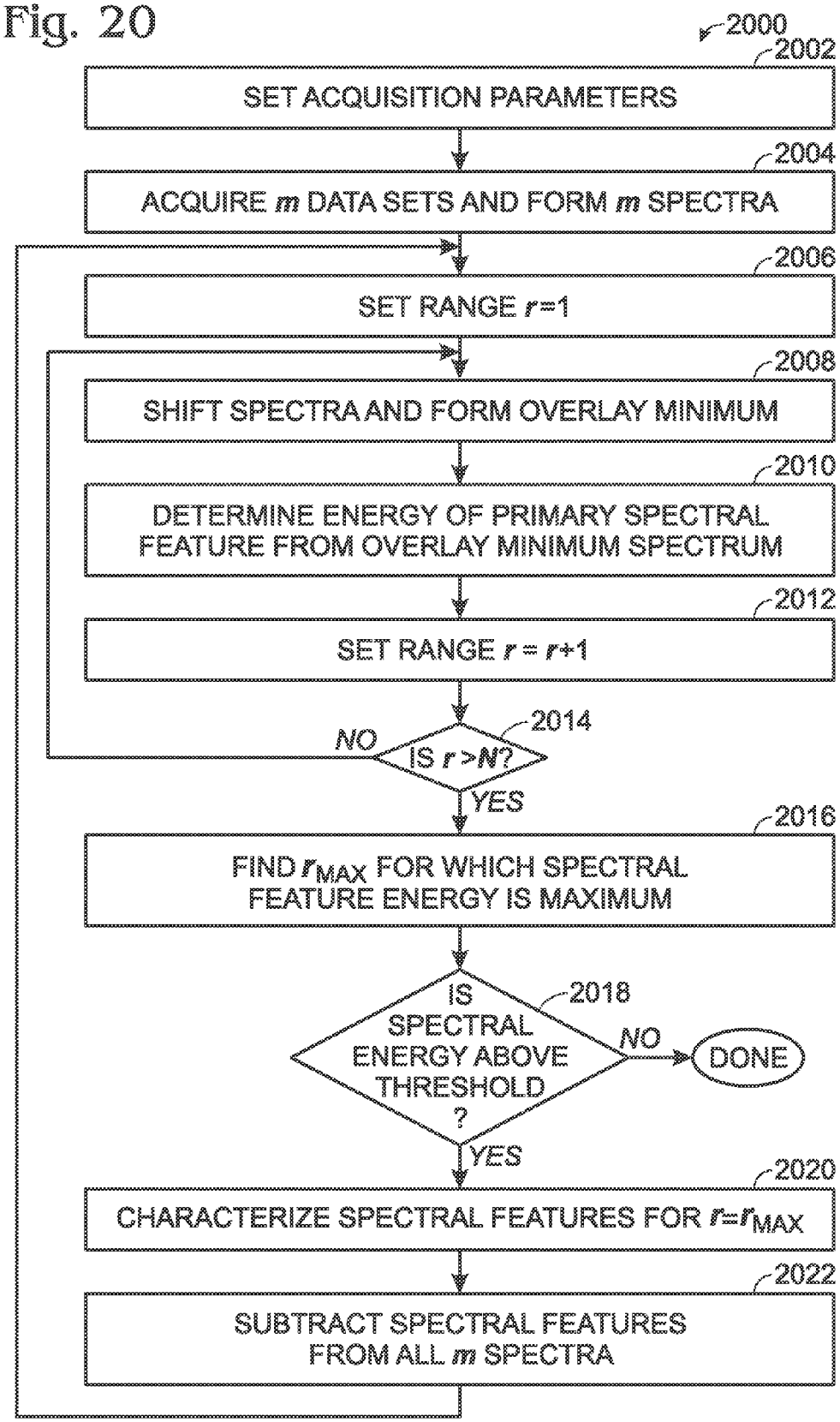
FIG. 20 is a flowchart depicting another example of a method of using either of the systems of FIG. 1 or 5.

Method 2000 depicted in FIG. 20 is an example of such a method. At a step 2002, acquisition parameters of the system may be set in a manner similar to step 1202 of method 1200. For example, at step 2002 the system may set PRF, maximum, gate width, and/or select m values of M. In method 2000, m may be an integer greater than or equal to 2, and preferably much greater than 2.

At a step 2004, the system may acquire m data sets and form m spectra, for example, in a manner similar to that of step 1204 of method 1200. However, at step 2004, a much larger number of data sets and spectra may be formed than at step 1204.

At a step 2006, the system may set the range parameter r to the first range gate.

At a step 2008, the system may shift the spectra and form an overlay of the shifted spectra for range r. For example, for each range gate, the system may shift (or translate the frequency of) the m spectra so that the m spectra are aligned at a zero-Doppler point (or shift) for that range gate.

At a step 2010, the system may determine a parameter indicative of the energy in the spectral feature parameters from the overlay created by step 2008. For example, the system may be configured to form a minimum (or minimum ensemble) of each of the overlays, and identify a resulting peak within a defined Doppler shift window as a target echo, and determine the associated spectral energy in this peak.

At step 2012, the system may increment the range r by one unit.

At step 2014, the system may return to step 2008 if the value of r does not exceed the maximum range of interest, or continue to step 2016 if it does.

At step 2016, the system may compare the measures of spectral energy characterized for each value of r, and select the value of r which had the strongest measure of spectral energy.

At step 2018, the system may compare the measure of spectral energy selected at step 2016 to a predetermined threshold or measure of significance, and may exit the procedure if that measure is below a pre-determined measure of significance.

If the measure of spectral energy is above the threshold, at step 2020, the system may characterize the spectral feature for the value of r selected in step 2016, and assign it to range r.

At step 2022, the system may subtract the spectral feature characterized in step 2020 from each of the m spectra, at the spectral locations appropriate for each value of M.

After completing step 2022, the system may return to step 2006 to increment r and continue the process.

Figure 21:
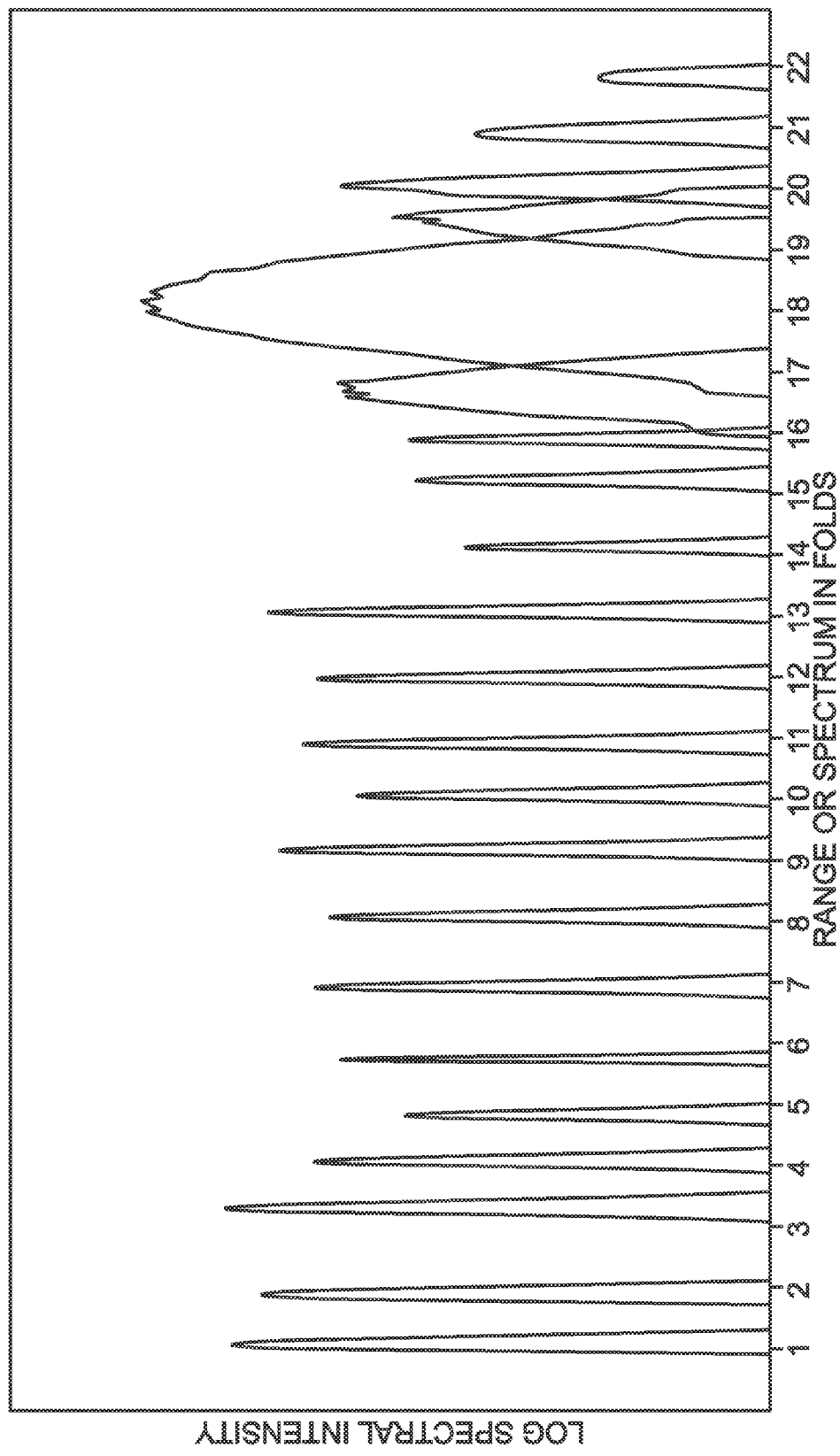
FIG. 21 is a chart which may be produced by the method of FIG. 20, illustrating an example of range response as created from the data of FIG. 13, with all range responses fully disambiguated.

FIG. 21 shows a chart which may be produced by the method of FIG. 20, as described above, illustrating an example of range response as created from the data of FIG. 13, with all range responses fully disambiguated.

In light of the above description, with reference to FIGS. 12-21 and other portions of this disclosure, a system and/or a computer program product may provide a method wherein characterizing spectral features of the received echo energy having overlapping or shifted spectral features from differing range intervals r may include acquiring spectra for m plural values of the constant M, and performing one or more of the following steps (a)-(e) until one or more spectral features at each range r with received echo energy exceeding a preset threshold value is characterized.

Step (a) may include performing one or more of the following steps (1)-(3) for each range r. Step (1) may include shifting the m spectra in circular fashion, so that they (e.g., the m spectra) coincide at a point in each spectrum where a reflection at zero Doppler velocity from that range r would lie. Step (2) may include creating for each range r a minimum spectrum by taking, for each frequency in the spectrum, the minimum value of the spectral energy at that frequency from an ensemble of the shifted spectra. Step (3) may include determining a value representative of the energy in the spectral peak of the minimum spectrum for each range r.

Step (b) may include selecting the range r which produces the largest such peak energy value. Step (c) may include characterizing one or more spectral features for this selected range r, from the minimum spectrum computed for range r. Step (d) may include removing the one or more spectral feature so characterized for this range r from all m spectra by subtraction, at the corresponding spectral location or locations. Step (e) may include repeating steps (a)-(d), using the m modified spectra to characterize the next highest spectral component.

Disclosed methods may be effective for characterizing properties of reflective objects traveling at relatively high velocities. For example, FIG. 22 shows the same data as FIG. 17, but with a large Doppler shift given to the signal at gate 18. Note that the reconstruction is successful despite the large Doppler shift. Accordingly, method 1600 (see FIG. 16), among others disclosed herein, may be effective for disambiguating parameters of target echoes having relatively large Doppler shifts.

For the operation described above, and in the case where the spectra for different values of M are taken at different RF frequencies, it will be appreciated that, while the center frequencies of the range gates, and the scale in terms of Doppler shift in Hz, remains constant with changing carrier frequency, the relationship between target velocity and spectral Doppler frequency does not remain constant with changing carrier frequency. For example, the spectral Doppler frequency shift for a given target velocity may scale linearly with the signal frequency. For this reason, when it is desired to match spectra acquired with differing values of M, it may be advisable to stretch or compress the spectrum slightly for each value of M, according to the RF frequency for which the spectrum was obtained. For example, the spectrum may be stretched or compressed by re-sampling the spectrum and appropriately maintaining the zero-Doppler-shift point at the center of the appropriate range gate for which the overlays are being computed.

FIG. 23 also shows the same data as FIG. 17, but with the spectral width of the signal greatly increased at gate 18. The composite spectra shown in FIG. 23 clearly reproduce the large spectral width of the signal, overlapping many range gates, without difficulty.

In some embodiments, false alarms may arise due to chance coincidences of peaks from all m spectra within a Doppler shift window, especially if the fraction of the total range gates with significant echo energy is very large, and the Doppler shift search window is large. However, if the statistics of the echo frequency and echo spectral width are known, then a false-alarm rate for the appearance in the solution of a false echo, due to a chance overlap of echoes from other ranges, can be determined. For cases where such false alarms are problematic, spectral features may be removed from the spectra as they are resolved and parameterized (e.g., at step 1608), which may reduce the percentage of range gates with significant echoes, and may greatly reduce the false-alarm rate.

From the above it will be appreciated that an apparatus or method of echo ranging may include transmitting constant frequency pulses of PRF=1/T Hz, with a pulse width of t seconds and a fixed pulse shape, with a quadratic phase modulation substantially applied at the time of transmission, such quadratic phase modulation being constant for the duration of each pulse, but differing from pulse to pulse, according to a relation $\phi(n)$ for defining the phase for each pulse n of a repeating sequence of N pulses. One example of such a quadratic sequence is the general quadratic relationship of length N, $\phi(n)=M(an^2+bn+c)$, where parameters b and c are arbitrary fixed phase shifts, parameters $a=b=\pi/N$ in units of radians, and M is an integer with absolute value between 1 and N−1. A phase modulation may also be substantially applied to the reflected energy at the time of reception, over the time interval of approximately t, using the same phase modulation sequence as that applied to the transmitted energy, applied in the opposite sense, and with the proper timing, such as, for example, using the phase to be applied to the next transmitted pulse, so that as a result the echo energy from a particular range interval r in [1,N] will have a net total phase shift due to the phase modulation at the times of transmission and reception alone equal to the phase applied to the received energy from range interval n by the receiver at the time of reception, minus the phase applied to the transmitter pulse which produced the reflection from the target, rT seconds prior to the time of reception, such phase difference being equal to $P(n+r)-\phi(n)=2\pi Mr/N$ radians per time interval T, plus quantities not changing with n, being equal to a frequency translation of (Mr/(NT) modulo PRF) Hz, where r is the range interval in [1,N], where it will be appreciated that the sign of the phase difference can be inverted without material effect on the apparatus or method.

Such discrete frequency translations Mr/(NT) Hz, when considered modulo the PRF=1/T Hz, produce a sequence of frequency translations as a function of M and r consisting of N discrete integer multiples of the frequency 1/(NT) Hz in [0,PRF] Hz, each multiple corresponding to one of N unambiguous range intervals or "gates", the distribution of these multiples being linear in range interval r for M=1, and in N−1 permutations of range order for values of M in [1,N−1], with energy from ranges beyond the round trip range delay of NT seconds being folded into frequencies within [0,PRF] and thus being ambiguous as to range. Such a discrete frequency translation may act on all sensible energy reflected from any and all targets within the range interval defined by M and r for that translation, weighting the echoes according to the transmitted pulse shape and the receiving time window, and upon no energy from other range intervals apart from the ambiguous range interval beyond time delay NT seconds, retaining in the spectral representation of this energy all characteristics of the spectrum of echoes from such targets.

Such an apparatus or method may be designed to produce a baseband time series of complex digital data representing, for each time interval T, the total amplitude and phase of the received data, including the contributions from all range intervals [1,N] and all frequencies within [0,PRF], as well as any range beyond the limit of the unambiguous range, which time series can have an arbitrary length in time and samples, irrespective of the value of N, to suit the requirements as to spectral resolution, which time series data is sent to a signal processor for processing into a spectral representation of the echoes received by the system over an unambiguous range interval equal to NT seconds.

Since it may be likely that such spectral representations of the distribution of target echoes over the range interval [1,N] and frequency interval [0,PRF] may include instances of broad or Doppler-displaced echoes overlaying other echo spectra and causing ambiguity as to the ranges and Doppler shifts to assign to those echoes, the method and apparatus may take advantage of the power of the method to reorder the [1,N] range gates over the frequency interval [0,PRF] in up to N−1 permutations by acquiring additional sets of spectra for differing values of M, either sequentially in time, simultaneously by using multiple transmitting frequencies with different values of M, and/or by using transmissions at orthogonal transmitter polarizations, with the values of N, a, and b held constant.

Each complex data series so produced can be treated by a variety of methods to extract the required information about the range distribution of target echoes, and the spectral properties of such echoes, exemplary treatments which begin with the production of a high-resolution complex spectrum for each of the one or more complex data sets representing one dwell time on a group of targets, such a high-resolution spectrum being conveniently produced through the Fourier transform of an extended complex time series, with the time series weighted by a windowing function, such as a Chebyshev window, appropriate to the dynamic range and spectral resolution required by the desired analysis.

Such a complex spectrum may represent all types of targets, both point and extended, and integrate such targets coherently to the extent possible given the spectral properties of the echoes, since the transmitted energy for a given spectrum consists of constant-frequency pulses. From this the complex spectrum may be obtained (from or with) further data sets: the power spectrum, equal to the squared magnitude of the complex spectrum; the autocovariance function, equal to the Fourier transform of a windowed segment of the power spectrum containing spectral features for one range gate; a time series for a single range interval from the inverse Fourier transform of a windowed segment of the complex spectrum; which data sets may be used in a variety of ways to characterize the spectra of echoes at each range interval.

In the case when the echo spectra at each range interval r are limited to features within the frequency interval of width 1/NT Hz, centered at the nominal center frequency for their respective range gates r, equal to Mr/NT modulo PRF Hz, then there is no range ambiguity and all spectra may be characterized by echo intensity, center frequency, spectral width, or other characteristics by a method such as pulse-pair processing of the recovered time series for each single gate, using data from a single value of M. When the echo spectra exceed such limitations by modest amounts, two values of M, such as +1 and −1, are required to resolve range ambiguities, as these two values treat the Doppler shifts relative to the frequency translation produced by the phase sequences with different signs in the two cases, allowing ambiguity resolution. Should the echo spectra for differing ranges overlay one another at one or more points in the spectra, due to wide spectral widths or large Doppler shifts, the use of various values of M can resolve such overlays through the reordering of the spectral order of the range gates, to an extent depending upon the number of range intervals with significant echo energy, since only one spectral representation without overlap is required to characterize an echo; other techniques such as least-squares fitting of multiple Gaussian or parabolic curves to a segment of the spectrum can also be used.

In cases with very large Doppler shifts, or very wide spectra, the spectra for a variety of values of M can be overlaid for a particular range interval r, each adjusted to match at the zero Doppler velocity for that range interval, and the minimum of the ensemble of spectra will identify the energy contributed from that range interval in the form of a spectrum biased slightly low in energy by a calculable amount due to the minimum function; in this case there is a probability of false alarm peaks being found, due to chance overlaps of echo spectra from ranges other than r, which probability is reduced by using a larger number of values of M, or increased by a high percentage of range intervals with significant echoes and/or a wide search window in Doppler shift for a peak; known areas of echo-free range can be used to design combinations of M to improve (or guarantee) the absence of false alarms.

The time interval T may be of such length in relation to the pulse width t that there is the possibility of only one reception interval of approximately t seconds, in which interval the time t is a significant proportion of the total interval T, such as 30%, so that the duty cycle of the echo location system transmitter is very high. The time interval T may be sufficiently long to permit multiple reception intervals of approximately t seconds after each pulse is transmitted, the received time series of each such sub-interval being processed separately in the same manner as described above, such operation being convenient for transmitters not capable of duty cycles of ≈30%.

The transmitter(s) and receiver(s) may be separated or otherwise isolated, such as by using bi-static or multi-static configurations, so that the transmitter(s) can run continuously, with the phase modulated transmitted pulse sequence comprising contiguous pulses of length t seconds, or slightly overlapping pulses in the case of shaped pulses, and the receiver reception periods comprising contiguous periods of length approximately t seconds, with such operation producing a 100% transmitter duty cycle.

This mode may be modified slightly for targets at very long range, such as a satellite, where local echoes not of interest are followed by a long range interval without echoes until the first echo from the target arrives, the transmitter may be operated with contiguous pulses in the mode just described, continuously for the interval up to a time prior to the arrival of echoes from the target sufficient to clear the local echoes, followed by a reception interval equal to the length of the transmission interval.

The wave energy transmitted may comprise electromagnetic waves, whatever the wavelength, either using coherent waves, or incoherent waves modulated with coherent waves.

It should be appreciated from the above description that a method provided by a system and/or a computer product may include generating a repeating sequence of N constant-frequency pulses for two or more values of the constant M (a) sequentially in time, (b) simultaneously using orthogonal wave polarizations, (c) simultaneously through the use of multiple-frequency carriers separately phase modulated, or (d) by any combination of the foregoing.

In some embodiments, there may be only one receiving subinterval range gate per transmitted pulse, wherein receiving echo energy includes receiving all echo energy from all ranges, and the method may further comprise producing only one time series and spectrum.

In some embodiments, there may be two or more receiving subinterval range gates per transmitted pulse, the phase modulation of the received echo energy may be applied separately to the energy in the two or more range gates, and the method may further comprise producing two or more time series and spectra.

In some embodiments, t may be equal to T, which may be the case of contiguous pulses with 100% duty cycle, and the method may further comprise transmitting the generated repeating sequence of N constant-frequency pulses. During the step of transmitting, the method may include receiving echo energy from objects reflecting the transmitted energy by a receiver isolated from the transmitter signal through one or both of physical separation and electromagnetic isolation.

In some embodiments, generating a repeating sequence of N constant-frequency pulses may be performed by a transmitter, and the method may further comprise receiving echo energy from objects reflecting the transmitted energy by a receiver co-located with the transmitter for mono-static operation.

In some embodiments, generating a repeating sequence of N constant-frequency pulses may be performed by one or more transmitters continuously transmitting the repeating sequence of N constant-frequency pulses, and the method may further comprise receiving echo energy from objects reflecting the transmitted energy by one or more remote receivers for bistatic or multi-static operation.

In some embodiments, the method may further comprise transmitting the generated repeating sequence of N constant-frequency pulses as electromagnetic waves, at audio, radio, optical, or other wavelengths, as acoustic waves, or as vibrational waves.

In some embodiments, the method may further comprise transmitting the generated repeating sequence of N constant-frequency pulses as phase-modulated coherent waves, or as incoherent wave carriers modulated by phase-modulated coherent waves.

Figure 24:
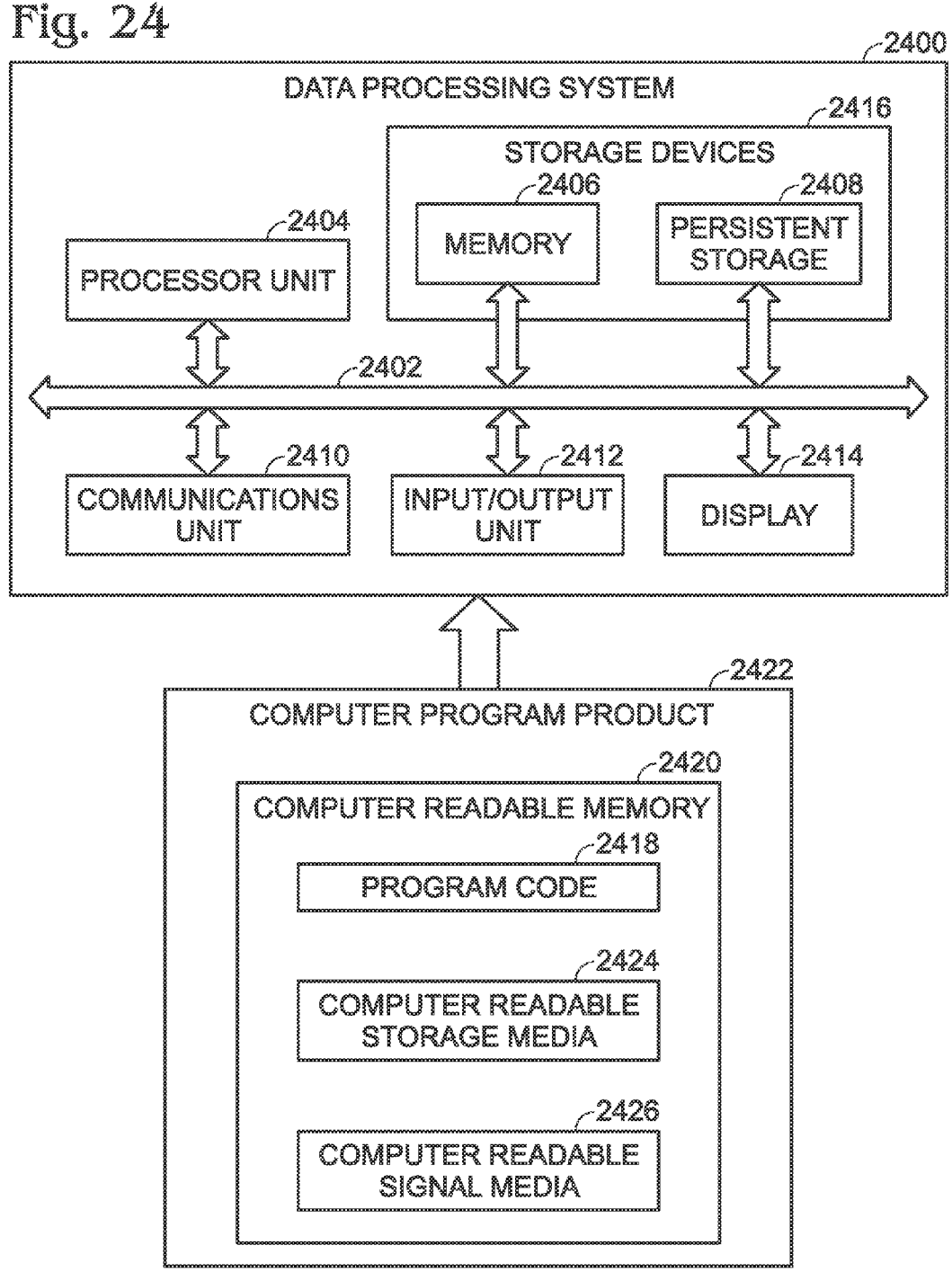
FIG. 24 is a schematic diagram of an illustrative data processing system in which illustrative embodiments may be implemented.

FIG. 24 shows a data processing system 2400 in which illustrative embodiments of signal processor 119 and/or signal processor 512 may be implemented. Data processing system 200 may include a communications framework 2402. Communications framework 2402 may provide communications between a processor unit 2404, a memory 2406, a persistent storage 2408, a communications unit 2410, an input/output (I/O) unit 2412, and a display 2414. Memory 2406, persistent storage 2408, communications unit 2410, input/output (I/O) unit 2412, and display 2414 are examples of resources accessible by processor unit 2404 via communications framework 2402.

Processor unit 2404 may run instructions for software that may be loaded into memory 2406, from a storage device, such as persistent storage 2408. Processor unit 2404 may be a number of processors, a multi-processor core, or some other type of processor, depending on the particular implementation. Further, processor unit 2404 may be implemented using a number of heterogeneous processor systems in which a main processor may be present with secondary processors on a single chip. As another illustrative example, processor unit 2404 may be a symmetric multi-processor system containing multiple processors of the same type.

Memory 2406 and persistent storage 2408 are examples of storage devices 2416. A storage device is any piece of hardware that is capable of storing information, such as, for example, without limitation, data, program code in functional form, and other suitable information either on a temporary basis or a permanent basis.

Storage devices 2416 also may be referred to as computer readable storage devices in these examples. Memory 2406, in these examples, may be, for example, a random access memory or any other suitable volatile or non-volatile storage device. Persistent storage 208 may take various forms, depending on the particular implementation.

For example, persistent storage 2408 may contain one or more components or devices. For example, persistent storage 2408 may be a hard drive, a flash memory, a rewritable optical disk, a rewritable magnetic tape, or some combination of the above. The media used by persistent storage 2408 or the device the storage media is contained in also may be removable. For example, a removable optical disk or removable flash drive may be used for computer readable storage media, or a removable hard drive may be used for persistent storage 2408.

Communications unit 2410, in these examples, may provide for communications with other data processing systems or devices. In these examples, communications unit 2410 may be a network interface card. Communications unit 2410 may provide communications through the use of either or both physical and wireless communications links.

Input/output (I/O) unit 2412 may allow for input and output of data with other devices that may be connected to data processing system 2400. For example, input/output (I/O) unit 2412 may provide a connection for user input through a keyboard, a mouse, and/or some other suitable input device. Further, input/output (I/O) unit 2412 may send output to a printer. Display 2414 may provide a mechanism to display information to a user.

Instructions for the operating system, applications, and/or programs may be located in storage devices 2416, which may be in communication with processor unit 2404 through communications framework 2402. In these illustrative examples, the instructions may be in a functional form on persistent storage 2408. These instructions may be loaded into memory 2406 for execution by processor unit 2404. The processes of the different embodiments may be performed by processor unit 2404 using computer-implemented instructions, which may be located in a memory, such as memory 2406, or transferred to a memory from a persistent storage device.

These instructions may be referred to as program instructions, program code, computer usable program code, or computer readable program code that may be read and executed by a processor in processor unit 2404. The program code in the different embodiments may be embodied on different physical or computer readable storage media, such as memory 2406 or media of persistent storage 2408.

Program code 2418 may be located in a functional form on computer readable media 2420 that is selectively removable and may be loaded onto or transferred to data processing system 2400 for execution by processor unit 2404. Program code 2418 and computer readable media 2420 may form computer program product 2422 in these examples. In one example, computer readable media 2420 may be computer readable storage media 2424 or computer readable signal media 2426.

Computer readable storage media 2424 may include, for example, an optical or magnetic disk that is inserted or placed into a drive or other device that is part of persistent storage 2408 for transfer onto a storage device, such as a hard drive, that is part of persistent storage 2408. Computer readable storage media 2424 also may take the form of a persistent storage device containing storage media, such as a hard drive, a thumb drive, or a flash memory, that is connected to data processing system 2400. In some instances, computer readable storage media 2424 may not be removable from data processing system 2400.

In these examples, computer readable storage media 2424 may be a physical or tangible storage device used to store program code 2418 rather than a medium that propagates or transmits program code 2418. Computer readable storage media 2424 may be also referred to as a computer readable tangible storage device or a computer readable physical storage device. In other words, computer readable storage media 2424 may be media that can be touched by a person.

Alternatively, program code 2418 may be transferred to data processing system 2400 using computer readable signal media 2426. Computer readable signal media 2426 may be, for example, a propagated data signal containing program code 2418. For example, computer readable signal media 2426 may be an electromagnetic signal, an optical signal, a voltage signal, and/or any other suitable type of signal. These signals may be transmitted over communications links, such as wireless communications links, optical fiber cable, coaxial cable, a wire, and/or any other suitable type of communications link. In other words, the communications link and/or the connection may be a physical structure or wireless in the illustrative examples.

In some illustrative embodiments, program code 2418 may be downloaded over a network to persistent storage 2408 from another device or data processing system through computer readable signal media 2426 for use within data processing system 2400. For instance, program code stored in a computer readable storage medium in a server data processing system may be downloaded over a network from the server to data processing system 2400. The data processing system providing program code 2418 may be a server computer, a client computer, or some other device capable of storing and transmitting program code 2418.

The different components illustrated for data processing system 2400 are not meant to provide architectural limitations to the manner in which different embodiments may be implemented. The different illustrative embodiments may be implemented in a data processing system including components in addition to and/or in place of those illustrated for data processing system 2400. Other components shown in FIG. 24 can be varied from the illustrative examples shown. The different embodiments may be implemented using any hardware device or system capable of running program code. As one example, data processing system 2400 may include organic components integrated with inorganic components and/or may be comprised entirely of organic components excluding a human being. For example, a storage device may be comprised of an organic semiconductor.

In another illustrative example, processor unit 2404 may take the form of a hardware unit that has circuits that are manufactured or configured for a particular use, such as firmware. This type of hardware may perform operations without needing program code to be loaded into a memory from a storage device to be configured to perform the operations.

For example, when processor unit 2404 takes the form of a hardware unit, processor unit 2404 may be a circuit system, an application specific integrated circuit (ASIC), a programmable logic device, or some other suitable type of hardware configured to perform a number of operations. With a programmable logic device, the device may be configured to perform a number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 2418 may be omitted, because the processes for the different embodiments may be implemented in a hardware unit.

In still another illustrative example, processor unit 2404 may be implemented using a combination of processors found in computers and hardware units. Processor unit 2404 may have a number of hardware units and a number of processors that are configured to run program code 2418. With this depicted example, some of the processes may be implemented in the number of hardware units, while other processes may be implemented in the number of processors.

In another example, a bus system may be used to implement communications framework 2402 and may be comprised of one or more buses, such as a system bus or an input/output bus. Of course, the bus system may be implemented using any suitable type of architecture that provides for a transfer of data between different components or devices attached to the bus system.

Additionally, communications unit 2410 may include a number of devices that transmit data, receive data, or both transmit and receive data. Communications unit 2410 may be, for example, a modem or a network adapter, two network adapters, or some combination thereof. Further, a memory may be, for example, memory 2406, or a cache, such as that found in an interface and memory controller hub that may be present in communications framework 2402.

This description is illustrative and directed to the apparatus, systems, and/or method(s) described, and is not limited to any specific invention or inventions. The claims that are appended to this description, whether now or later in this or a subsequent application, define specific inventions included in the described apparatus and or methods. No single feature or element, or combination thereof, is essential to all possible combinations that may now or later claimed. While examples of apparatus and methods are particularly shown and described, many variations may be made therein. Such variations, whether they are directed to different combinations or directed to the same combinations, whether different, broader, narrower or equal in scope, are also regarded as included within the subject matter of the present disclosure. An appreciation of the availability, scope or significance of various inventions may not be presently realized. Thus, any given invention disclosed by example in the disclosure does not necessarily encompass all or any particular features, characteristics or combinations, except as specifically claimed.

Where "a" or "a first" element or the equivalent thereof is recited, such usage includes one or more such elements, neither requiring nor excluding two or more such elements. Further, ordinal indicators, such as first, second or third, for identified elements are used to distinguish between the elements in the order in which they are introduced, and do not indicate a required or limited number of such elements, and do not indicate a particular position or order of such elements unless otherwise specifically indicated. Accordingly, the ordinal indicator used for a particular element may vary in different contexts.

The invention claimed is:

1. A computer program product comprising:
    at least one computer readable non-transitory storage medium having computer readable program instructions embodied therewith, the computer readable program instructions, when read by a processor of a signal-processing system of an echo-ranging system, configuring the processor to:
    generate for transmission a repeating sequence of N constant-frequency pulses of width t seconds at interpulse intervals of T seconds, with each pulse in the sequence having a particular constant phase according to a quadratic phase sequence, which phase is applied to each pulse in a first sense of modulation;
    modulate the phase of echo energy received from one or more objects reflecting the transmitted repeating sequence of N constant-frequency pulses during each receiving subinterval by the identical quadratic phase sequence used for the transmitted repeating sequence of N constant-frequency pulses, with a second sense of modulation opposite to the first sense of modulation, so that the net phase modulation applied to echo energy reflected from a particular reflecting object at a particular range r, measured in discrete units of T of round-trip echo time, is a difference between the phase of the transmitted pulses at the time of their transmission and the phase applied to the received echo energy from range r; and
    produce from the modulated received echo energy N unique and discrete frequency translations of the received echo energy as a function of range r of the reflecting objects, of magnitude equal to multiples of 1/NT Hz, which frequency translations preserve the spectrum of the received echo energy, forming in combination a composite signal frequency spectrum.

2. The computer program product of claim 1, wherein the computer readable program instructions, when read by the processor further configure the processor to generate a repeating sequence of N constant-frequency pulses having phases according to the quadratic phase sequence represented by $\phi(n)=M(an^2+bn+c)$, where $\phi(n)$ is the phase applied to a pulse having pulse index n, M is an integer constant having no common factors with N; n is the index of pulses in the repeating sequence in the range 1 to N; a is a constant defining the repeating interval of the phase sequence, when considered modulo one rotation of phase, set to $\pi/N$ for phase units of radians; b and c are constants of any value; wherein producing N frequency translations includes producing a frequency translation of the received echo energy as a function of range r of the form $Ma(r-i)/NT$ Hz modulo 1/T Hz, where the index i represents any index offset in n between the application of $\phi(n)$ to the generated pulse, and the application of $\phi(n)$ to the received echo energy.

3. The computer program product of claim 2, wherein the computer readable program instructions, when read by the processor further configure the processor to:
    determine that one or more spectral features of the received echo energy for a sequence of transmitted pulses having phases generated using a single value of the constant M fall within a spectral interval of 1/NT Hz for each respective range r, without spectral overlap;
    characterize unambiguously spectral features of the corresponding received echo energy from each range r; and
    assign the characterized spectral features to a particular range.

4. The computer program product of claim 2, wherein the computer readable program instructions, when read by the processor further configure the processor to:
- determine that the spectral features of the received echo energy from one or more of the at least one or more reflecting objects fall outside a spectral interval of 1/NT Hz for one or more of the respective ranges, or spectral features of the received echo energy from differing ranges overlap, producing an ambiguity in the assignment of range to spectral features in the echo energy spectrum;
- generate a repeating sequence of N constant-frequency pulses using plural values of the constant M;
- determine parameters of spectral features of the corresponding received echo energy to disambiguate shifted or overlapping spectral features by finding, for each range r, at least one value of the constant M for which any such shift or overlap is resolved through permutations of spectral range order produced by differing values of M;
- characterize spectral features of the received echo energy from each range r having overlapping or shifted spectral features; and
- assign the characterized spectral features to a particular range.

5. The computer program product of claim 4, wherein the computer readable program instructions, when read by the processor further configure the processor to:
- acquire spectra for m plural values of the constant M;
- characterize for any ranges r those spectral features which can be assigned unambiguously as to range from any of the m spectra;
- subtract the spectral features so characterized for each corresponding range r from each of the m spectra, at the respective spectral location for the feature for each value of M; and
- repeat the preceding two steps with the modified spectra for remaining spectral features.

6. The computer program product of claim 4, wherein the computer readable program instructions, when read by the processor further configure the processor, where the received echo energy has overlapping or shifted spectral features from differing range intervals r, to:
- acquire spectra for m plural values of the constant M, and performing the following steps for each range r:
  - (a) shift the acquired m spectra circularly, so that they align at the point in each spectrum where received echo energy at zero Doppler velocity from that range r would lie;
  - (b) create a minimum spectrum by taking, for each frequency in the aligned spectra, the minimum value at that frequency from an ensemble of aligned spectra; and
  - (c) characterize any spectral features in the minimum spectrum exceeding a preset threshold value and located within a predetermined frequency window as representing the spectral features for one or more objects at range r.

7. The computer program product of claim 4, wherein the computer readable program instructions, when read by the processor further configure the processor, where the received echo energy has overlapping or shifted spectral features from differing range intervals r, to:
- acquire spectra for m plural values of the constant M, and perform the following steps until one or more spectral features at each range r with received echo energy exceeding a preset threshold value is characterized:
- (a) perform the following steps 1-3 for each range r:
  - (1) shift the m spectra in circular fashion, so that they coincide at the point in each spectrum where a reflection at zero Doppler velocity from that range r would lie; and
  - (2) create for each range r a minimum spectrum by taking, for each frequency in the spectrum, the minimum value of the spectral energy at that frequency from an ensemble of the shifted spectra; and
  - (3) determine a value representative of the energy in the spectral peak of the minimum spectrum for each range r;
- (b) select the range r which produces the largest such peak energy value;
- (c) characterize one or more spectral features for this selected range r, from the minimum spectrum computed for range r;
- (d) remove the one or more spectral feature so characterized for this range r from all m spectra by subtraction, at the corresponding spectral location or locations; and
- (e) repeat steps (a)-(d), using the m modified spectra to characterize the next highest spectral component.

\* \* \* \* \*